United States Patent
Iwaji et al.

(10) Patent No.: US 8,232,751 B2
(45) Date of Patent: Jul. 31, 2012

(54) DRIVE SYSTEM OF SYNCHRONOUS MOTOR

(75) Inventors: Yoshitaka Iwaji, Hitachinaka (JP);
Yasuhiko Kokami, Takasaki (JP);
Minoru Kurosawa, Takasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 312 days.

(21) Appl. No.: 12/547,693

(22) Filed: Aug. 26, 2009

(65) Prior Publication Data

US 2010/0066284 A1   Mar. 18, 2010

(30) Foreign Application Priority Data

Sep. 17, 2008 (JP) ................. 2008-237346

(51) Int. Cl.
*H02P 6/00* (2006.01)
(52) U.S. Cl. .......... 318/400.02; 318/400.05; 318/400.17
(58) Field of Classification Search ............. 318/400.02, 318/400.05, 400.17
See application file for complete search history.

(56) References Cited

U.S. PATENT DOCUMENTS

| 5,486,747 | A * | 1/1996 | Welch | 318/811 |
| 5,869,944 | A * | 2/1999 | Tanina | 318/599 |
| 6,025,683 | A * | 2/2000 | Philipp | 318/257 |
| 7,166,975 | B2 * | 1/2007 | Mori et al. | 318/400.36 |
| 7,619,385 | B2 * | 11/2009 | Suzuki et al. | 318/705 |
| 2009/0200971 | A1 | 8/2009 | Iwaji et al. | |

FOREIGN PATENT DOCUMENTS

| JP | 7-245981 A | 9/1995 |
| JP | 2000-232797 A | 8/2000 |
| JP | 2001-275387 A | 10/2001 |
| JP | 2003-189674 A | 7/2003 |
| JP | 2004-166500 A | 6/2004 |

* cited by examiner

*Primary Examiner* — Walter Benson
*Assistant Examiner* — David Luo
(74) *Attorney, Agent, or Firm* — Mattingly & Malur, PC

(57) ABSTRACT

A position sensorless drive method capable of driving a permanent magnet motor by an ideal sine-wave current and enabling the driving from an extremely low-speed range in the vicinity of zero-speed is provided. A neutral-point potential of the permanent magnet motor is detected in synchronization with a PWM waveform of an inverter. The position of a rotor of the permanent magnet motor is estimated from the variation of the neutral-point potential. Since the neutral-point potential is varied in accordance with the magnetic circuit characteristics of an individual permanent magnet motor, the position can be detected regardless of the presence of saliency of the permanent magnet motor.

9 Claims, 17 Drawing Sheets

INVERTER OUTPUT VOLTAGE

θd AND VOLTAGE VECTORS $$V_n = \left\{ \frac{L_w}{L_v // L_u + L_w} - (2/3) \right\} \times VDC$$

$$V_n = \left\{ \frac{L_w // L_u}{L_w // L_u + L_v} - (1/3) \right\} \times VDC$$

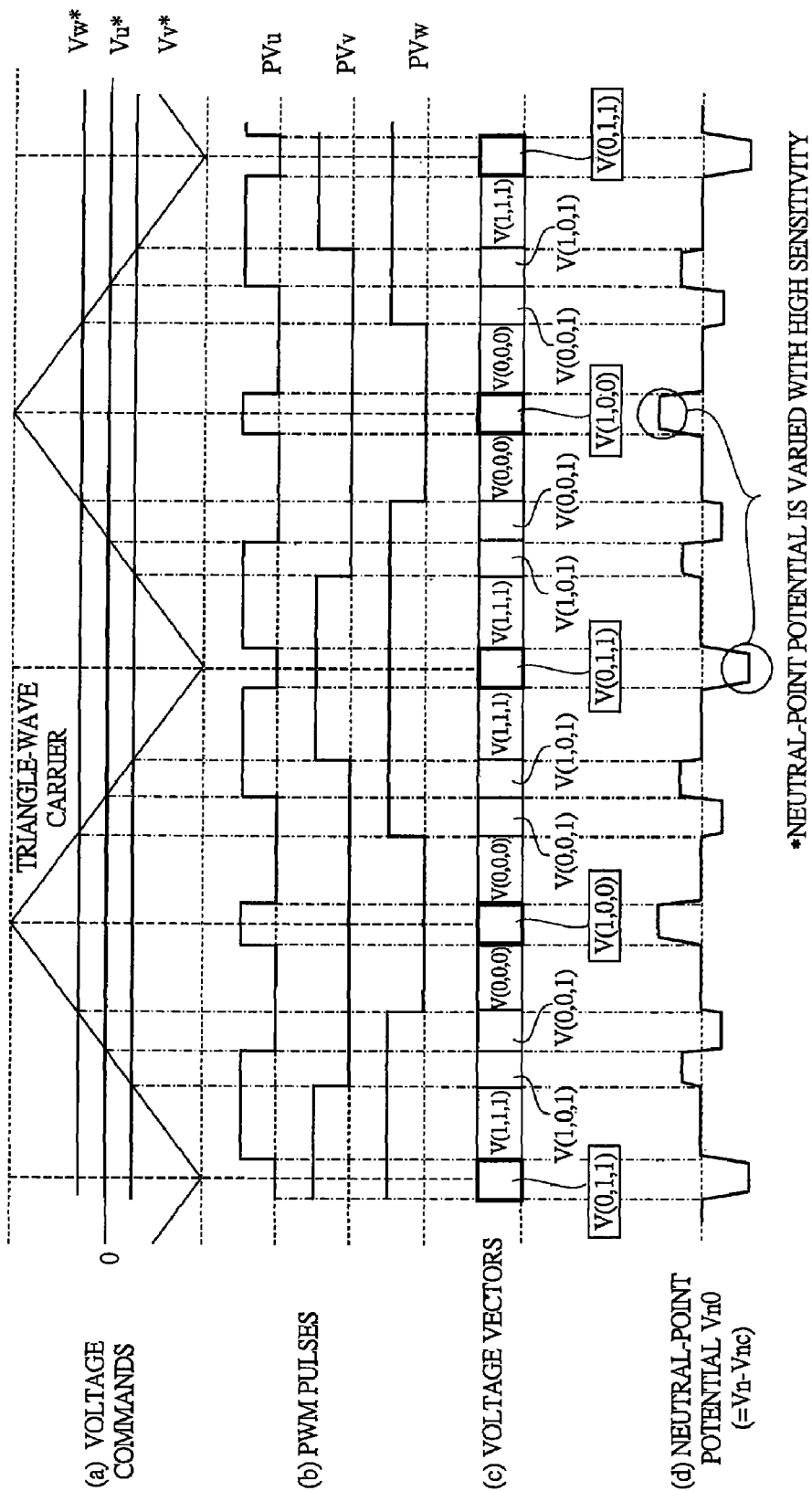

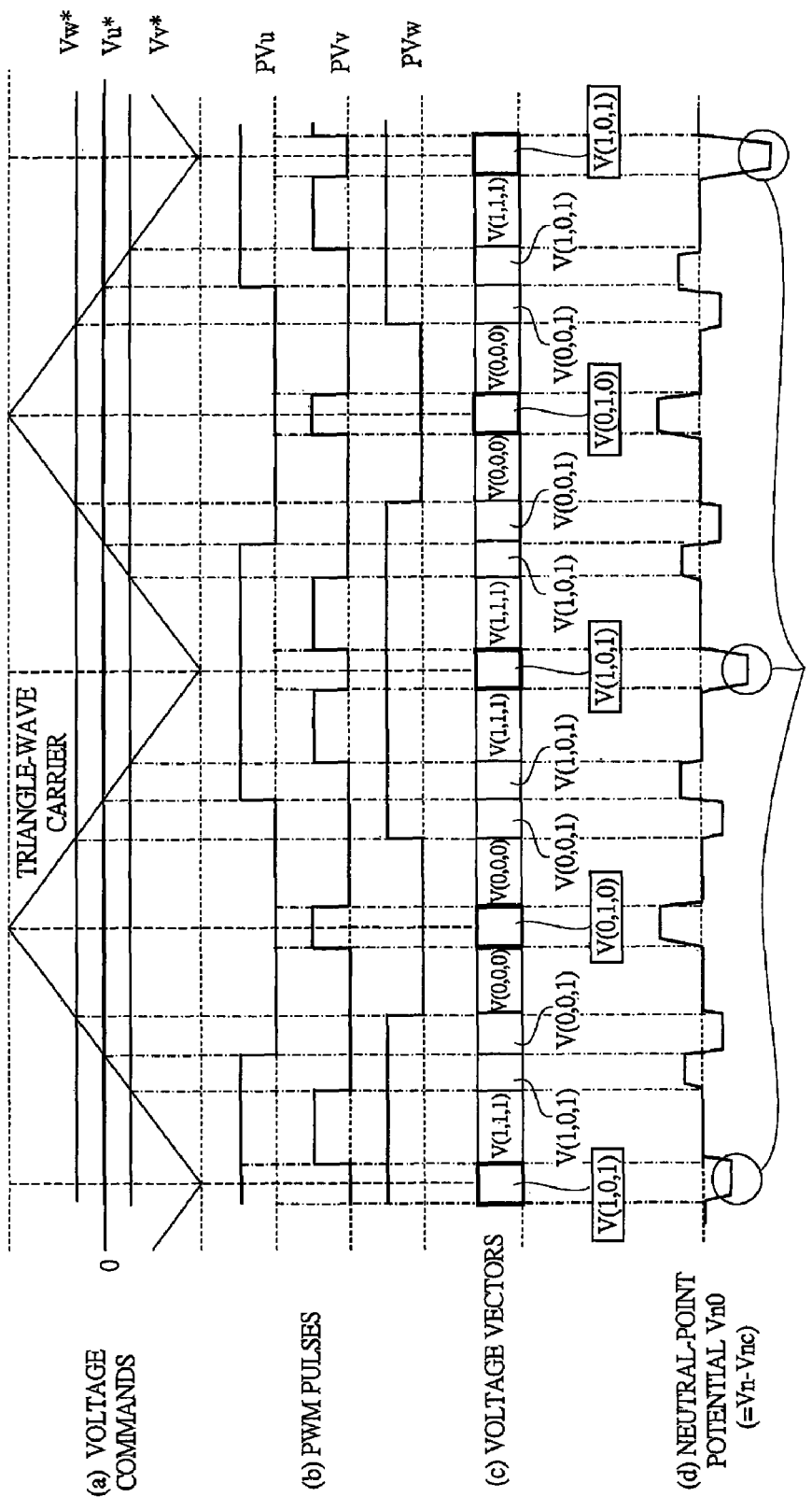

(a) SAMPLE/HOLD NEUTRAL-POINT POTENTIAL AT RISING OF PWM PULSE (b) SAMPLE/HOLD NEUTRAL-POINT POTENTIAL IN LATTER HALF OF PWM PULSE

DRIVE SYSTEM OF SYNCHRONOUS MOTOR

CROSS-REFERENCE TO RELATED APPLICATION

The present application claims priority from Japanese Patent Application No. JP 2008-237346 filed on Sep. 17, 2008, the content of which is hereby incorporated by reference into this application.

TECHNICAL FIELD OF THE INVENTION

The present invention relates to a technique utilized for the rotation speed control of motor drivers such as hard disk drivers (HDD), optical disk drivers, spindle motors, fans, pumps and compressors.

BACKGROUND OF THE INVENTION

In motor drivers such as spindle motors of HDD devices, fans and pumps, small and highly-efficient permanent magnet motors (three-phase synchronous motors) are widely used.

However, in order to drive a permanent magnet motor, position information of a rotor of the motor is necessary, and therefore, a position sensor therefor has been needed. In recent years, the sensorless control, in which the number of rotations and torque of a permanent magnet motor are controlled without using the position sensor, has been widely spread.

By virtue of the practical realization of the sensorless control, the cost of the position sensor (for example, the costs of the sensor itself and wiring thereof) can be cut and the size of the device can be reduced. Moreover, since the sensor is not needed, there is an advantage that it can be used under a bad environment.

Currently, in the sensorless control of the permanent magnet motor, for example, a method in which an induced voltage (speed-induced voltage) generated by rotation of the rotor of the permanent magnet motor is directly detected and used as the position information of the rotor, thereby driving the permanent magnet motor, a position estimating technique in which the rotor position is estimated and calculated from a mathematical expression model of an intended motor and others are employed.

These sensorless controls also have a big problem. It is a position detection method during low-speed drive. Most of the sensorless controls which are currently in practical use are based on the induced voltage generated by the permanent magnet motor. Therefore, when the motor is stopped or in a low-speed range in which the induced voltage is low, the sensitivity is lowered, and the position information may be buried in noise. Various measures have been proposed against this problem.

The invention described in Japanese Patent Application Laid-Open Publication No. 7-245981 (Patent Document 1) is a method in which high-frequency power is distributed to a permanent magnet motor and the position of a rotor is detected from the current generated at that point. The rotor of the permanent magnet motor needs saliency, and the position detection is enabled by the influence of current harmonic waves caused by the salient-pole structure.

In the invention described in Japanese Patent Application Laid-Open Publication No. 2001-275387 (Patent Document 2), two phases of a three-phase stator coil are sequentially selected to apply a pulse-like voltage thereto, the pulse voltage induces the voltage of the phase to which the power is not distributed (in this case, transformer induced voltage), and the induced voltage is detected to estimate the position of a rotor from the voltage pattern thereof. This is for the reason that, since the saturation state of a magnetic circuit is varied by the position of the rotor, the induced voltage corresponding to the position is generated in the phase to which power is not distributed. Therefore, In the invention described in Patent Document 2, the position information can be acquired even in a completely stopped state.

In the invention described in Japanese Patent Application Laid-Open Publication No. 2003-189674 (Patent Document 3), the method described in Patent Document 2 is partially employed in the start-up (acceleration), and the acceleration is carried out reliably while checking the position of the rotor.

In the invention described in Japanese Patent Application Laid-Open Publication No. 2000-232797 (Patent Document 4), a "neutral-point potential" which is the potential of a connecting point of a three-phase stator coil is detected so as to obtain the position information. Although it takes the labor for leading of the neutral point of the stator coil, the position information can be obtained even when the three phases are in the power-distributed state at the same time. Therefore, a permanent magnet motor can be ideally driven by a sine-wave current.

SUMMARY OF THE INVENTION

However, in the invention described in Patent Document 1, the rotor structure of the motor needs saliency. The position detection sensitivity is lowered in the structure having low or no saliency, and the position estimation becomes difficult. Moreover, in order to carry out the highly sensitive detection, high-frequency components to be injected have to be increased or the frequency has to be lowered, which causes rotation pulsing, vibration and noise.

In the inventions described in Patent Documents 2 and 3, the rotor position information of the permanent magnet motor can be obtained even in an extremely low-speed range. However, one phase of the three-phase coil has to be always in an open state so as to check the induced voltage. Therefore, the drive current of the permanent magnet motor has an intermissive square-wave shape. Essentially, driving a permanent magnet motor by a sine-wave current is advantageous to reduce uneven rotation or to suppress harmonic wave loss. However, in the inventions described in these publicly-known documents, sine-wave drive cannot be expected.

In the invention described in Patent Document 4, a third harmonic wave voltage generated at the neutral-point potential is utilized. Therefore, the drive current thereof can form sine waves. However, since the induced voltage itself of the third harmonic wave is a speed-induced voltage caused by the rotation of the permanent magnet motor, the position information in a low speed range cannot be obtained.

In view of these problems, an object of the present invention is to provide a position sensorless drive method capable of driving a permanent magnet motor by an ideal sine-wave current and enabling the drive from an extremely low speed range in the vicinity of zero speed.

The above and other objects and novel characteristics of the present invention will be apparent from the description of this specification and the accompanying drawings.

The typical ones of the inventions disclosed in this application will be briefly described as follows.

A drive system of a synchronous motor according to an typical embodiment of the present invention comprises: an inverter outputting a sine-wave AC current; a three-phase synchronous motor connected to the inverter; and a controller detecting a neutral-point potential of the three-phase synchronous motor and outputting a pulse-width modulation signal to the inverter based on a result of the detection, thereby controlling the inverter, wherein the controller includes a sample/hold circuit which derives a sampling value by synchronizing the neutral-point potential of the three-phase synchronous motor with the pulse-width modulation signal, and based on the sampling value, the controller estimates a position of a rotor of the three-phase synchronous motor.

In the drive system of the synchronous motor, the controller provides a period in which at least one phase of a three-phase output potential of the inverter has a potential different from the other two phases, and in the period, the sample/hold circuit samples the neutral-point potential and derives the sampling value.

In the drive system of the synchronous motor, the controller provides two or more periods in which at least one phase of a three-phase output potential of the inverter has a potential different from the other two phases, and in the periods, the sample/hold circuit samples the neutral-point potential and derives the sampling value.

In the drive system of the synchronous motor, "a neutral-point potential detection dedicated period" which is a period in which at least one phase has a potential different from the other two phases is inserted in a period in which all of the output potentials of the three phases of the inverter are mutually equal, and the sample/hold circuit samples the neutral-point potential in the neutral-point potential detection dedicated period.

In the drive system of the synchronous motor, the pulse-width modulation signal is generated based on comparison between a triangle-wave carrier signal and an AC voltage command applied to the three-phase synchronous motor, and the sample/hold circuit samples the neutral-point potential around an upper dead point and a lower dead point of the triangle-wave carrier signal.

In the drive system of the synchronous motor, when the sample/hold circuit samples/holds the neutral-point potential of the period in which the at least one phase of the output potential of the three phases of the inverter has the potential different from the other two phases, a timing of holding the neutral-point potential is in a latter-half period later than an intermediate point of the period.

Another drive system of a synchronous motor according to an typical embodiment of the present invention comprises: an inverter outputting a sine-wave AC current; a three-phase synchronous motor connected to the inverter; and a controller detecting a neutral-point potential of the three-phase synchronous motor and outputting a pulse-width modulation signal to the inverter based on a result of the detection, thereby controlling the inverter.

In the drive system of the synchronous motor, the controller includes: a d-axis current controller outputting a d-axis voltage command in accordance with an input d-axis current command; and a d-axis current command generator providing the current command to the d-axis current controller, and the d-axis current command generator provides an excitation current to the current command based on an estimated phase of a position of a rotor.

In the drive system of the synchronous motor, the controller further includes a position estimator and a memory, and the position estimator records the neutral-point potential of the three-phase synchronous motor to the memory while driving the three-phase synchronous motor in an open loop.

Another drive system of a synchronous motor according to an typical embodiment of the present invention comprises: an inverter outputting a sine-wave AC current; a three-phase synchronous motor connected to the inverter; a first controller detecting a neutral-point potential of the three-phase synchronous motor and outputting a pulse-width modulation signal to the inverter based on a result of the detection, thereby controlling the inverter; a second controller provided with means of detecting or estimating an induced voltage of the three-phase synchronous motor and outputting a pulse-width modulation signal to the inverter based on a detection value or an estimation value of the induced voltage, thereby controlling the inverter; and switching means of switching an output of the first controller and an output of the second controller and outputting either one of the outputs to the inverter, wherein if the number of rotations of the three-phase synchronous motor is less than a predetermined threshold value, the output of the first controller is selected by the switching means and output to the inverter, and if the number of rotations is equal to or more than the threshold value, the output of the second controller is selected by the switching means and output to the inverter.

In these drive systems of the synchronous motor, the drive system is formed on a same semiconductor substrate.

The effects obtained by typical embodiments of the inventions disclosed in this application will be briefly described below.

In a drive system of a three-phase synchronous motor according to a typical embodiment of the present invention, sensorless drive can be realized from an extremely low-speed range in the vicinity of the zero speed by an ideal sine-wave current. Thus, since ideal drive from a low-speed range can be realized, vibrations and noise caused by rotation pulsing can be reduced, efficiency can be improved, and start-up time can be shortened. Moreover, since the method itself is simple, the method is extremely effective in the case of forming a dedicated IC.

BRIEF DESCRIPTIONS OF THE DRAWINGS

FIG. 12A is a diagram showing the state of actual modulation of pulse widths by use of a triangle-wave carrier and the state of changes of the voltage vector and the neutral-point potential at that point in the third embodiment;

FIG. 12B is a diagram showing the state of actual modulation of pulse widths by use of a triangle-wave carrier and the state of changes of the voltage vector and the neutral-point potential at that point in the third embodiment;

DESCRIPTIONS OF THE PREFERRED EMBODIMENTS

Hereinafter, embodiments of the present invention will be described with reference to drawings.

First Embodiment

Figure 1:
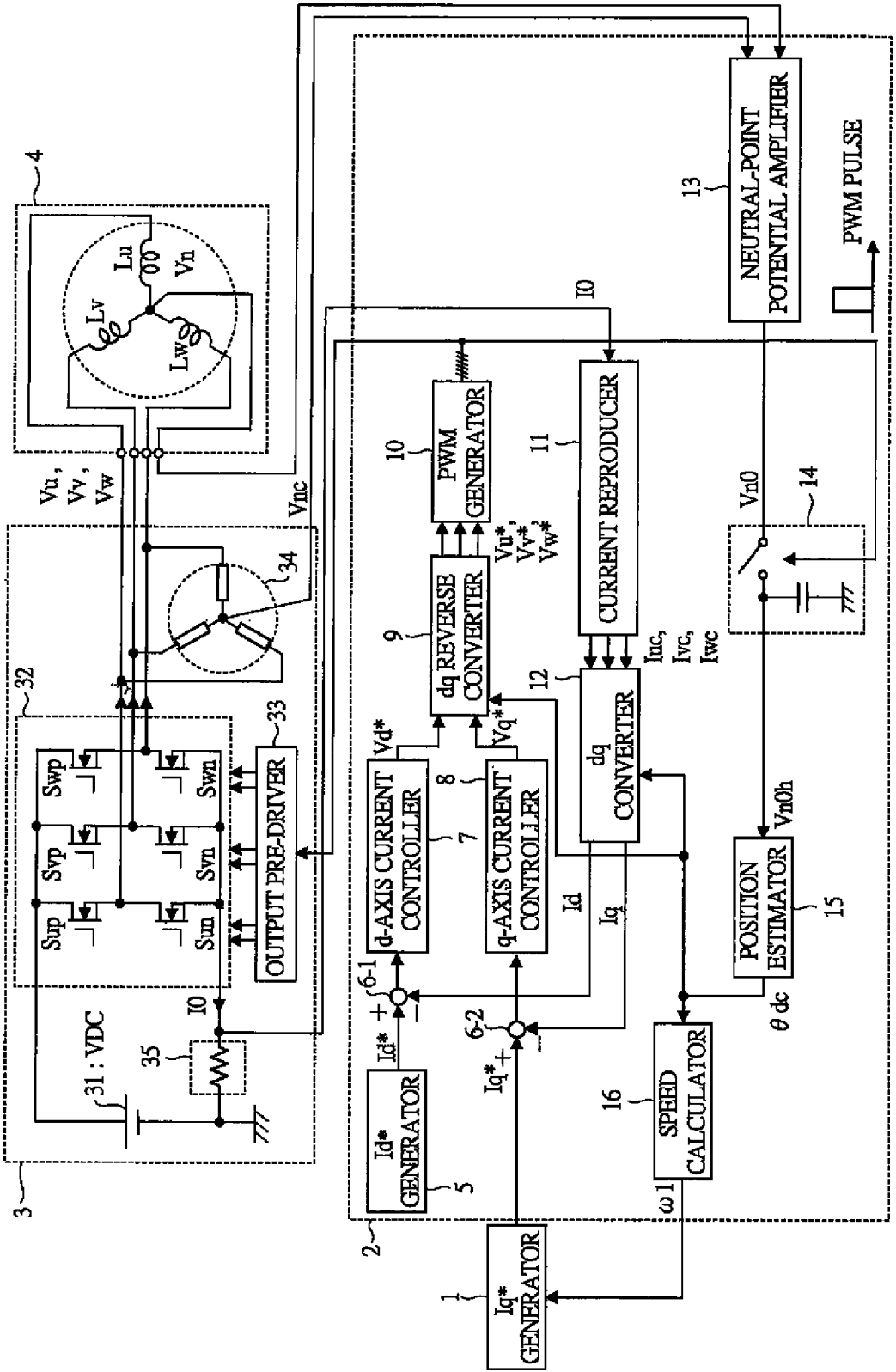
FIG. 1 is a block diagram showing a configuration of a motor drive system according to a first embodiment.

FIG. 1 is a block diagram showing a configuration of a motor drive system according to a first embodiment of the present invention.

An object of this motor drive system is to drive a permanent magnet motor (three-phase synchronous motor) 4. When roughly divided, the motor drive system comprises: an Iq* generator 1; a controller 2; an inverter 3 including an inverter main circuit 32 and a one-shunt current detector 35; and a permanent magnet motor 4 to be driven.

The Iq* generator 1 is a circuit which generates a current command Iq* corresponding to torque of a motor. The Iq* generator 1 is a controller positioned in an upper level of the controller 2. Usually, the generator has a mechanism to generate a necessary current command Iq* while observing an actual speed $\omega 1$ so that the number of rotations of the permanent magnet motor 4 reaches a predetermined speed. The current command Iq*, which is the output of the Iq* generator 1, is output to a subtractor 6-2 in the controller 2.

The controller 2 operates so that the permanent magnet motor 4 generates the torque corresponding to the current command Iq*. The controller 2 comprises: an Id* generator (d-axis current command generator) 5; a subtractor 6-1; the subtractor 6-2; a d-axis current controller (IdACR) 7; a q-axis current controller (IqACR) 8; a dq reverse converter 9; a PWM generator 10; a current reproducer 11; a dq converter 12; a neutral-point potential amplifier 13; a sample/hold circuit 14; a position estimator 15; and a speed calculator 16.

The inverter 3 includes a DC power source 31, an output pre-driver 33, and a virtual neutral-point circuit 34 in addition to the inverter main circuit 32 and the one-shunt current detector 35 mentioned above.

The Id* generator 5 generates a current command Id* of a d-axis current corresponding to the excitation current of the permanent magnet motor. The current command Id* is output to the subtractor 6-1.

The subtractor 6-1 is a subtractor which obtains the error between the current command Id*, which is the output of the Id* generator 5, and the output Id of the dq converter 12, which is derived and reproduced from the output of the inverter main circuit 32. In order to fill the difference (correct the error to 0), the subtractor 6-1 outputs a calculation result to the d-axis current controller 7. On the other hand, the subtractor 6-2 is a subtractor which obtains the error between the current command Iq*, which is the output of the Iq* generator 1, and the output Iq of the dq converter 12, which is derived and reproduced from the output of the inverter main circuit 32. In order to fill the difference (correct the error to 0), the subtractor 6-2 outputs a calculation result to the q-axis current controller 8.

The d-axis current controller (IdACR) 7 is a circuit which calculates a voltage command Vd* on dq coordinate axes based on the current deviation of the subtractor 6-1. On the other hand, the q-axis current controller (IqACR) 8 is a circuit which calculates a voltage command Vq* on the dq coordinate axes based on the current deviation of the subtractor 6-2. The voltage command Vd*, which is the output of the d-axis current controller 7, and the voltage command Vq*, which is the output of the q-axis current controller 8, are output to the dq reverse converter 9.

The dq reverse converter 9 is a circuit which converts the voltage commands Vd* and Vq* of the dq coordinate (magnetic-flux axis and orthogonal axis thereto) system to those on three-phase AC coordinates. The dq reverse converter 9 converts the input voltage commands Vd* and Vq* and the output θdc of the position estimator 15 to control signals of the three-phase AC coordinate system (three-phase AC voltage commands) Vu*, Vv*, and Vw*. The dq reverse converter 9 outputs the conversion result to the PWM generator 10.

The PWM generator 10 is a circuit for outputting a PWM (Pulse Width Modulation) signal for controlling the output pre-driver 33. The PWM generator 10 turns on/off the inverter main circuit 32 based on the three-phase AC voltage commands Vu*, Vv*, and Vw*. The output thereof is input also to the sample/hold circuit 14 as well as the output pre-driver 33.

The current reproducer 11 is a circuit which receives a signal I0, which is the output from the inverter main circuit 32 to the one-shunt current detector 35, and reproduces the currents of a U phase, a V phase, and a W phase. The reproduced currents (Iuc, Ivc, and Iwc) of the phases are output to the dq converter 12.

The dq converter 12 is a circuit which converts Iuc, Ivc, and Iwc, which are the reproduced values of the phase currents of the motor, to Id and Iq on the dq coordinates, which are rotation coordinate axes. The converted Id and Iq are used in the deviation calculations of the current command Id* and the current command Iq* in the subtractors 6.

The neutral-point potential amplifier 13 is a circuit which detects and amplifies the difference (hereinafter, referred to as a neutral-point potential Vn0) between a virtual neutral-point potential Vnc which is the output of the virtual neutral-point circuit 34 and a three-phase coil connecting-point potential Vn of the permanent magnet motor 4. The amplification result of the neutral-point potential amplifier 13 is input to the sample/hold circuit 14.

The sample/hold circuit 14 is an A-D converter for sampling and quantizing (sampling) the analog signal output of the neutral-point potential amplifier 13. The sample/hold circuit 14 samples the Vn0 in synchronization with the PWM pulse which is the output of the PWM generator 10. The sample/hold circuit 14 outputs the sampled result (Vn0h) to the position estimator 15 as a digital signal.

The position estimator 15 is a circuit which estimates and calculates the rotor position (phase angle) θd of the permanent magnet motor 4 based on the neutral-point potential sampled by the sample/hold circuit 14. This estimation result is output to the speed calculator 16 and the dq converter 12.

The speed calculator 16 is a circuit which calculates the rotation speed of the permanent magnet motor from the estimate value θdc of the rotor position. This estimated rotation speed ω1 is output to the Iq* generator 1 and utilized for the control of the axis orthogonal to the magnetic flux axis.

The DC power source 31 is a DC power source which supplies a current to the inverter 3.

The inverter main circuit 32 is an inverter circuit comprising six switching elements Sup to Swn.

The output pre-driver 33 is a driver which directly drives the inverter main circuit 32.

The virtual neutral-point circuit 34 is a circuit which generates a virtual neutral-point potential with respect to the output voltage of the inverter main circuit 32.

The one-shunt current detector 35 is a current detector which detects the current I0 supplied to the inverter main circuit 32.

Next, basic operations of this motor drive system will be described.

The present invention is based on the vector control technique which is generally known as a method for linearizing the torque of a synchronous motor which is an AC motor.

As the principle of the vector control technique, the current Iq which contributes to torque and the current Id which contributes to magnetic flux are independently controlled on the rotation coordinate axes (dq coordinate axes) based on the rotor position of the motor. The d-axis current controller 7, the q-axis current controller 8, the dq reverse converter 9, the dq converter 12 and others in FIG. 1 are main parts for realizing the vector control technique.

In the motor drive system of FIG. 1, the current command Iq* corresponding to a torque current is calculated by the Iq* generator 1, and current control is carried out so that the current command Iq* and the actual torque current Iq of the permanent magnet motor 4 are matched with each other.

When the motor is a permanent magnet motor of a non-salient-pole type, usually, "zero" is provided as the current command Id*. On the other hand, in the case of a permanent magnet motor of a salient-pole structure or a field weakening control, a negative command is sometimes given as the current command Id*.

In the current detection of the permanent magnet motor, it is desirable to directly detect the phase currents supplied from the inverter to the permanent magnet motor. However, in the current detection of a small permanent magnet motor, the method in which the DC current is detected and the phase currents are reproduced and calculated in the controller is employed in many cases. There are publicly known techniques for the method of reproducing and calculating the phase currents from the DC current I0, and its description is omitted because this is not a main part of the present invention.

Next, the operation principles of the neutral-point potential amplifier 13, the sample/hold circuit 14, and the position estimator 15 which are characteristic parts of the present invention will be described.

The neutral-point potential Vn0 of the permanent magnet motor 4 is changed by the influence of the rotor position of the motor. The basic principle of the present invention is to reversely estimate the rotor position from the change of the neutral-point potential by applying this principle.

First, the principle of change of the neutral-point potential will be described.

Regarding the output potentials of the phases of the inverter 3, one of the upper and lower switches of the inverter main circuit 32 is always on and the other is always off. Therefore, the output voltage of the inverter 3 has eight switching patterns in total.

Figure 2:
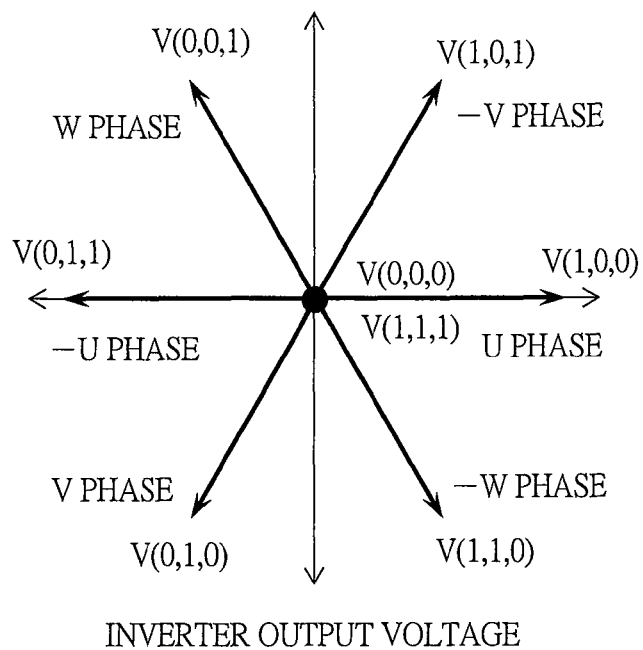
FIG. 2 is a vector diagram showing the switching state of an inverter output voltage.

FIG. 2 is a vector diagram showing the switching state of the inverter output voltage. Meanwhile, FIG. 3 is a vector diagram showing the relation between the rotor position (phase) θd and the voltage vectors.

Each vector is named like V(1,0,0). In this vector notation, each parameter expresses the on state of the upper switch as "1" and the on state of the lower switch as "0". Also, the arrangement of the numbers in the parentheses expresses the switching state in the order of "U phase, V phase, and W phase". The inverter output voltage can be expressed as eight vectors including two zero vectors. Sine-wave currents are supplied to the permanent magnet motor 4 by the combinations thereof.

Figure 3:
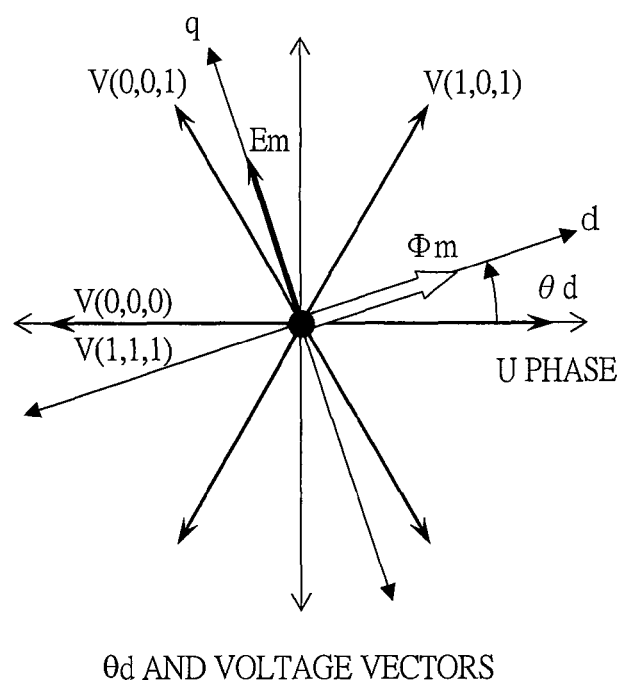
FIG. 3 is a vector diagram showing the relation between a rotor position (phase) θd and voltage vectors.

With using the U-phase direction as the reference of the rotor position of the permanent magnet motor 4, the rotor position (phase) θd is defined like FIG. 3. Regarding the dq coordinate axes which are rotation coordinates, the d-axis direction matches the direction of a magnet Φm, and it rotates anticlockwise.

In the vicinity of θd=0 degree, an induced voltage Em is in the q-axis direction shown in FIG. 3. Under this condition, the permanent magnet motor 4 is driven by mainly using the voltage vectors V(1,0,1) and V(0, 0,1).

Figure 4:
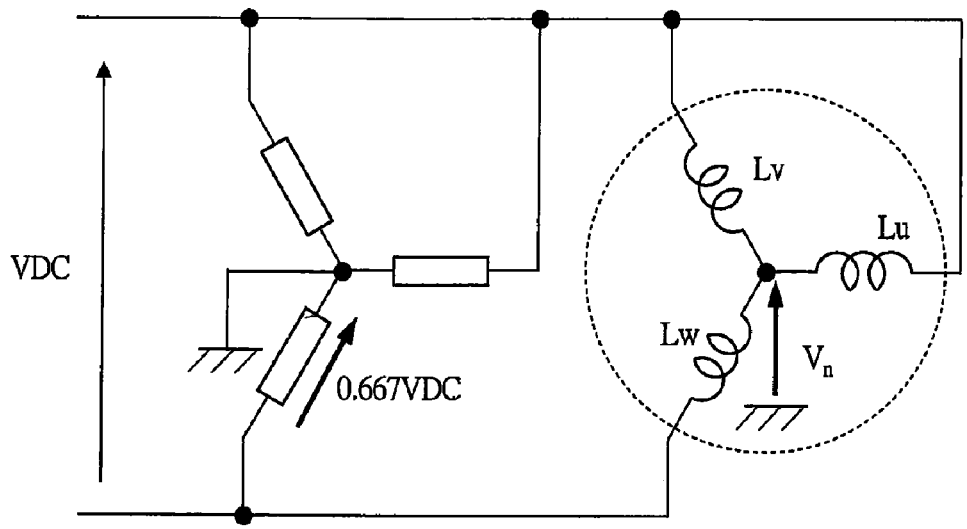
FIG. 4 is a conceptual diagram showing the relation between a permanent magnet motor in the state where a voltage vector V(1,0,1) is applied thereto and a virtual neutral-point circuit.
Figure 5:
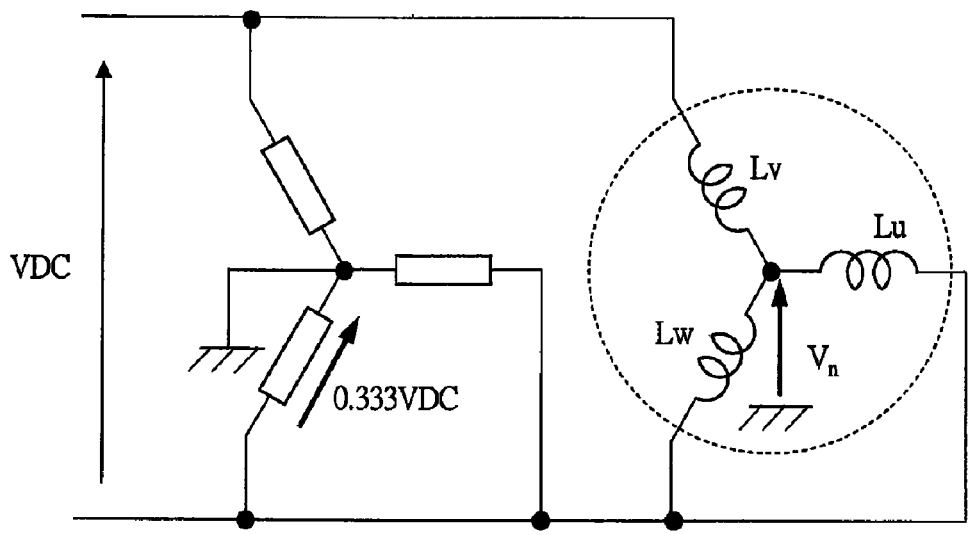
FIG. 5 is a conceptual diagram showing the relation between a permanent magnet motor in the state where a voltage vector V(0, 0,1) is applied thereto and a virtual neutral-point circuit.

FIG. 4 is a conceptual diagram showing the relation between the permanent magnet motor 4 in the state where the voltage vector V(1,0,1) is applied thereto and the virtual neutral-point circuit 34. Meanwhile, FIG. 5 is a conceptual diagram showing the relation between the permanent magnet motor 4 in the state where the voltage vector V(0, 0,1) is applied thereto and the virtual neutral-point circuit 34.

The neutral-point potential Vn0 can be calculated in accordance with the expressions written below the figures.

In the above-described expressions, if all of the coil inductances (Lu, Lv, Lw) of the three phases are mutually equal, the neutral-point potential Vn0 becomes always "0". However, an actual permanent magnet motor is affected by the permanent-magnet magnetic flux of the rotor, and some differences are generated in the inductances. The neutral-point potential is varied by the differences of the inductances.

Figure 6:
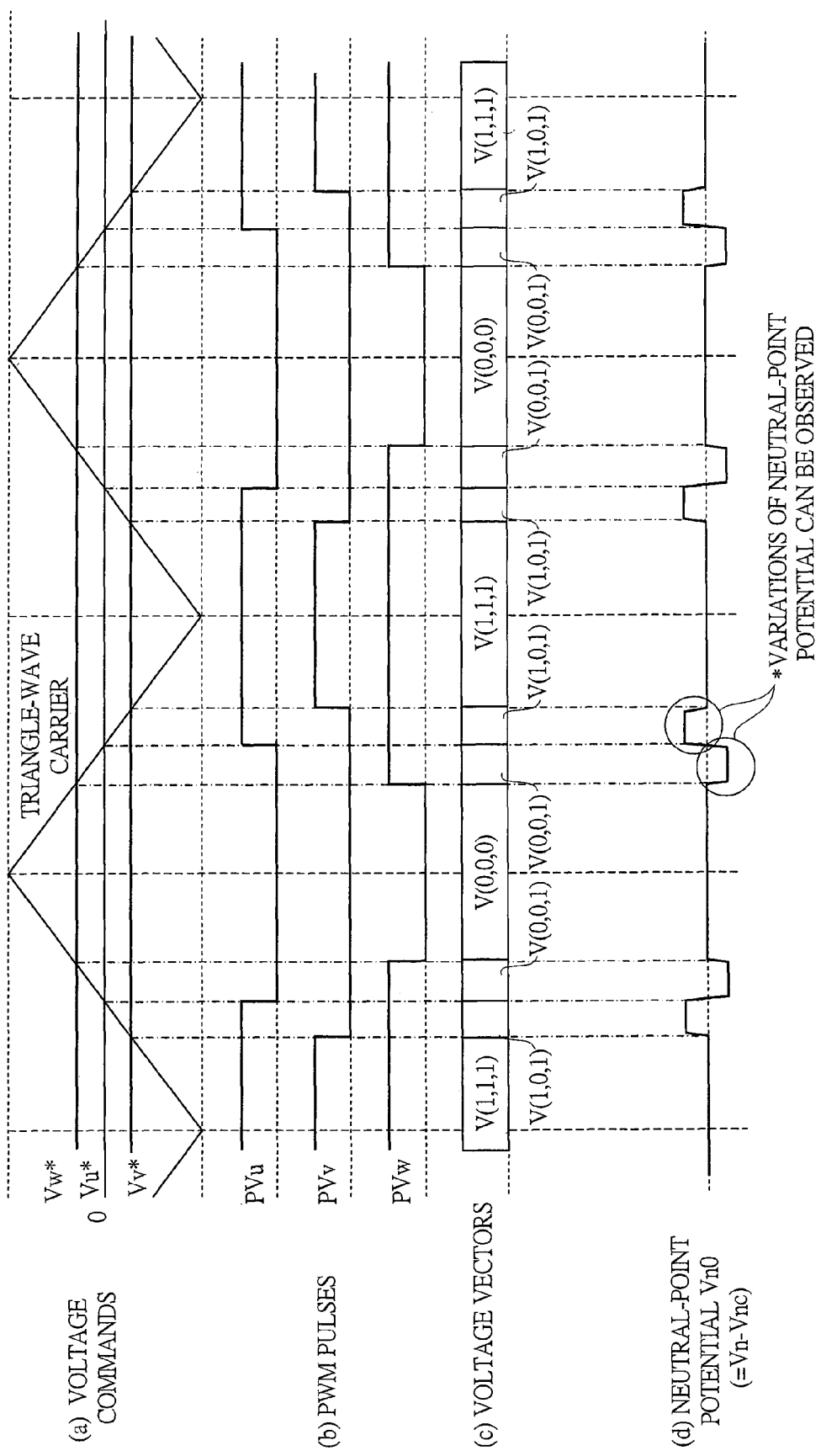
FIG. 6 is a diagram showing the state of actual modulation of pulse widths by use of a triangle-wave carrier and the state of changes of the voltage vector and the neutral-point potential at that point in the first embodiment.

FIG. 6 is a diagram showing the state of actual modulation of pulse widths by use of a triangle-wave carrier and the state of changes of the voltage vector and the neutral-point potential at that point in the present embodiment. Herein, the triangle-wave carrier signal is a signal which serves as a reference for converting the "magnitude" of the three-phase voltage commands Vu*, Vv*, and Vw* to the pulse widths, and the PWM pulses can be created by comparing the magnitude relation between the triangle-wave carrier and Vu*, Vv*, and Vw*. It can be seen that the rise and fall of the PWM pulses in (b) of FIG. 6 are changed at the points where the magnitude relation between the voltage commands Vu*, Vv*, and Vw* and the triangle-wave carrier is changed in (a) of FIG. 6.

As can be understood from this figure, the neutral-point potential Vn0 is changed in accordance with the state of the PWM pulses.

Therefore, it is important to detect the neutral-point potential in synchronization with the PWM pulse signal at the time when the permanent magnet motor 4 is driven.

Moreover, it can be understood that the neutral-point potential is largely changed at the points of the vectors other than the zero vectors (V(0, 0, 0) and V(1, 1, 1)), that is, at the points of the switching state where the potential of at least one phase is different from the others among the output potentials of the three phases of the inverter. Herein, "the points of the switching state where the potential of at least one phase is different from the others" are generated by the difference in rise timing of PVu, PVv, and PVw of the PWM pulses in (b) of FIG. 6.

The state where the output potential of one phase of the three phases is different is a period which is inevitably inserted if a normal sine-wave PWM operation is carried out, and a characteristic of the present invention resides in detecting the neutral-point potential by targeting this period.

Figure 7:
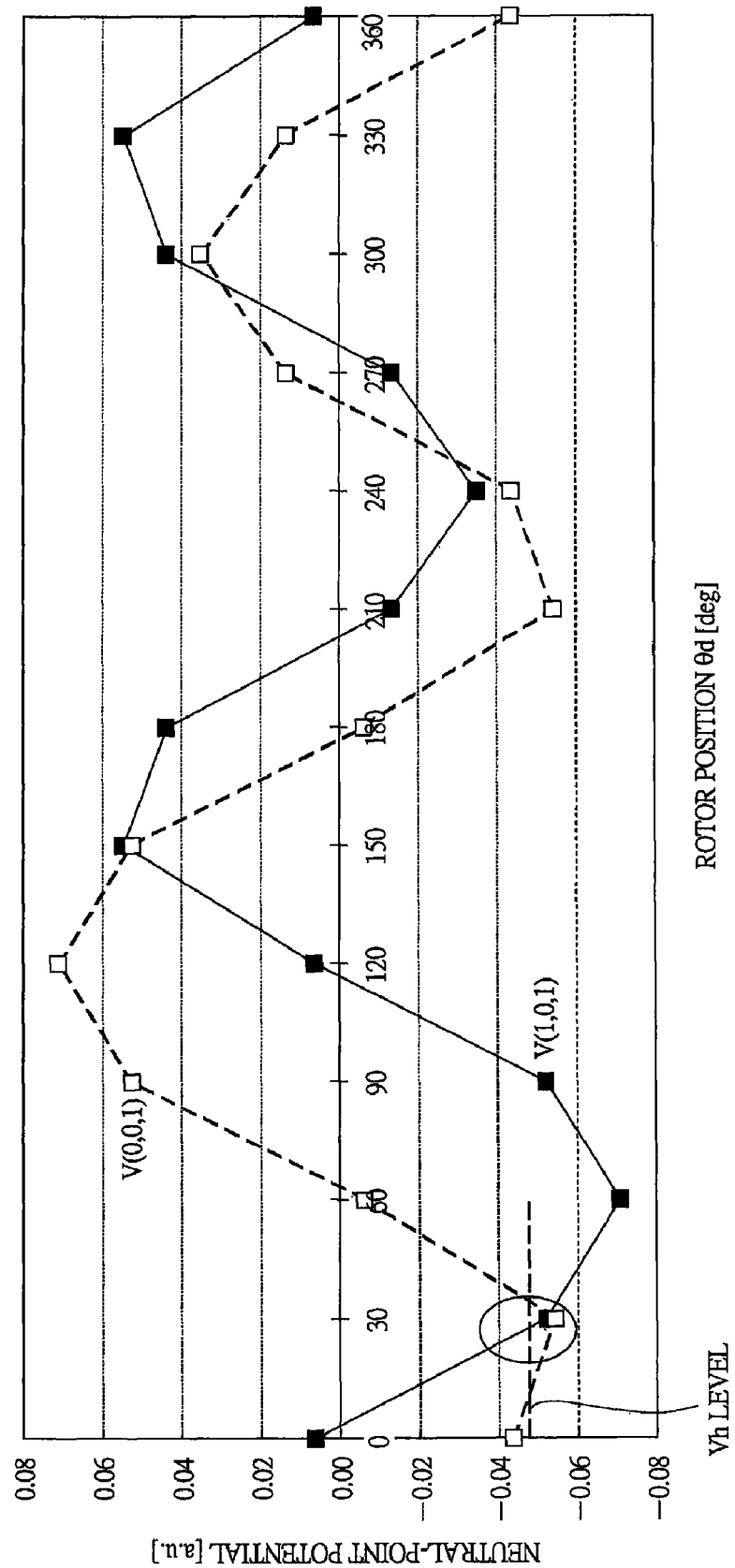
FIG. 7 is a diagram showing neutral-point potentials measured at the respective vectors while changing the rotor position by the amount corresponding to one cycle in the state where the switching patterns of FIG. 6 are maintained.

FIG. 7 is a diagram showing the neutral-point potentials measured at the respective vectors while changing the rotor position by the amount corresponding to one cycle in the state where the switching patterns of FIG. 6 are maintained.

It can be understood that the neutral-point potential Vn0 is largely changed depending on the rotor position θd at the time of application of voltage vectors of V(1,0,1) and V(0, 0,1). Therefore, when the neutral-point potential is detected at a vector other than the zero vectors (in other words, a vector with the switching state in which the potential of at least one phase among the output potentials of the three phases of the inverter is different from the others), the rotor position information can be obtained, and the position can be estimated.

This phenomenon can be described as follows.

When a voltage vector which is not zero is applied to the permanent magnet motor 4, a transient current is generated in the phase current of the motor. This transient current is "current ripple" itself in a steady state.

The magnitude of the inductance of the motor is dominant for the generation amount of the current ripple, and the inductance is varied by the position of the rotor. Therefore, the variation of the inductance depending on the position of the rotor becomes obvious by the application of the voltage vector which is not zero, and the variation can be observed as the variation of the neutral-point potential.

Next, a characteristic operation of the present invention will be described in detail.

Figure 8:
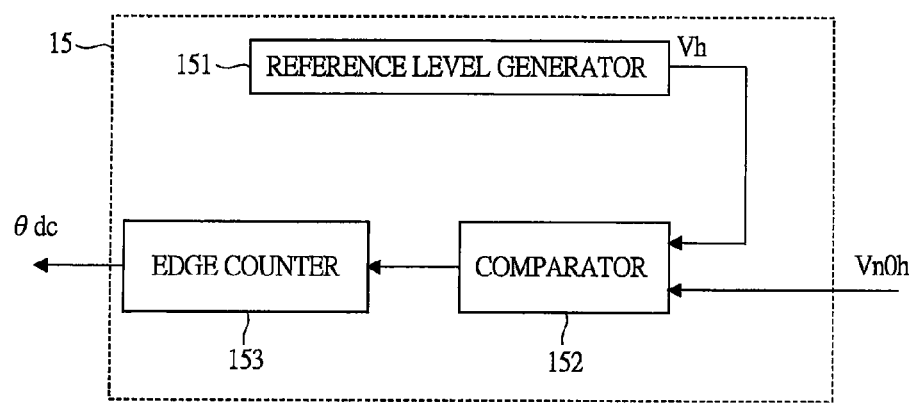
FIG. 8 is a block diagram showing a configuration of a position estimator according to the first embodiment.

In FIG. 1, the neutral-point potential amplifier 13 is an amplifier for enhancing the sensitivity of the neutral-point potential. The signal thereof is sampled in the sample/hold circuit 14 in synchronization with the PWM pulses. Based on the sampled neutral-point potential Vn0h, the position estimator 15 detects the position. FIG. 8 is a block diagram showing a configuration of the position estimator 15.

The position estimator 15 comprises a reference level generator 151, a comparator 152, and an edge counter 153.

The reference level generator 151 sets a reference level Vh for switching phases.

The comparator 152 is a comparator which compares the reference level Vh, which is output from the reference level generator 151, with the neutral-point potential Vn0h and outputs the result of the comparison as High/Low.

The edge counter 153 is a counter which increments a counter value at the timing (edge) when the comparison result, which is the output of the comparator 152, is changed. The output thereof serves as the position estimate value θdc.

Now, the case in which the rotor position θd is in the vicinity of zero will be considered. In this case, it is assumed that the sampling of the neutral-point potential is carried out by, for example, the voltage vector V(1,0,1). Then, the neutral-point potential decreases to the negative side along with the increase of the rotor position θd as shown in FIG. 7. At this time, when the reference level Vh is appropriately set, the fact that the rotor position θd exceeds 30 degrees can be detected.

Consequently, at the point when the comparison result, which is the output of the comparator 152, is inverted, the position estimate value θdc, which is a count value of the edge counter 153 which is a phase in the control, is incremented, and a transition to a next voltage vector mode can be made.

As described above, by continuing the observation of the neutral-point potential and the comparison with the reference value, the rotor position θd and the position estimate value θdc in the control can be matched. As a result, the position of the rotor of the permanent magnet motor 4 can be derived without any sensor.

Second Embodiment

Next, a second embodiment of the present invention will be described.

In the first embodiment, the reference level Vh is provided, this level is compared with the neutral-point potential Vn0h, and at a time when exceeding a predetermined value as a result of the comparison, the phase is updated. The reference level Vh in this case is a fixed value.

When the reference level Vh is a fixed value, the phase information is taken at every 60 degrees in terms of electrical angle, and the resolving power thereof is too low to drive the permanent magnet motor by an ideal sine-wave current. An object of the second embodiment is to solve this problem.

Figure 9:
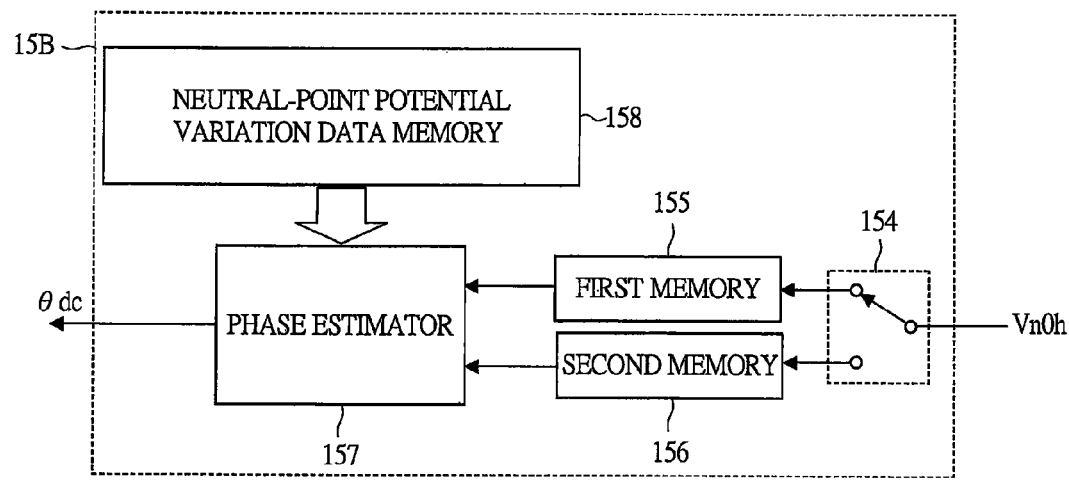
FIG. 9 is a block diagram showing a configuration of a position estimator according to a second embodiment.

FIG. 9 is a block diagram showing a configuration of a position estimator 15B according to the second embodiment. In the present embodiment, the position estimator 15B is used instead of the position estimator 15 of the first embodiment.

The position estimator 15B comprises a switch 154, a first memory 155, a second memory 156, a phase estimator 157, and a neutral-point potential variation data memory 158. The position estimator 15B uses both detection values of the neutral-point potentials at the time of applying two voltage vectors.

The switch 154 is a switch for switching the detection values of the two neutral-point potentials and storing them in the first memory 155 and the second memory 156.

The first memory 155 and the second memory 156 are memories for storing the values of the sampled (quantized, sampled) neutral-point potentials Vn0h. As described above, two voltage vectors are applied in the present invention, and these memories record the respective neutral-point potentials Vn0h. Herein, it is assumed that the neutral-point potential stored in the first memory is Vn0h(1) and the neutral-point potential stored in the second memory is Vn0h(2).

The neutral-point potential variation data memory 158 is a memory for saving the variation characteristics of the neutral-point potentials of FIG. 7 as neutral-point potential variation data. When the neutral-point potential variation data is saved in the range of ±30 degrees, the data can be utilized in all the phase area by utilizing the symmetry.

The phase estimator 157 compares the neutral-point potential Vn0h(1) and the neutral-point potential Vn0h(2) with the neutral-point potential variation data stored in the neutral-point potential variation data memory 158 and estimates and calculates the current rotor position θd.

As described above, in the second embodiment, the position information can be continuously obtained by using the neutral-point potential information of the two voltage vectors. Consequently, the accuracy and reliability of the whole motor drive system are improved.

Third Embodiment

Next, a third embodiment of the present invention will be described.

In the first and second embodiments, the PWM signal of the normal operation is used and the neutral-point potential is detected in synchronization with the PWM signal, thereby obtaining the position information. As described above, the variation of the neutral-point potential is dependent on the magnetic circuit characteristics in the permanent magnet motor 4. Therefore, the characteristics largely differ depending on specifications such as the capacity and the number of rotations of the permanent magnet motor 4. Depending on the motor structure, the case in which the detection sensitivity of the position information is insufficient is conceivable.

The present embodiment solves this problem. In the present embodiment, detection pulses of the neutral-point potential are intentionally inserted so as to create equipotential period insertion sampling periods, and the neutral-point potential is observed under the conditions of high sensitivity in the equipotential period insertion sampling periods.

Figure 10:
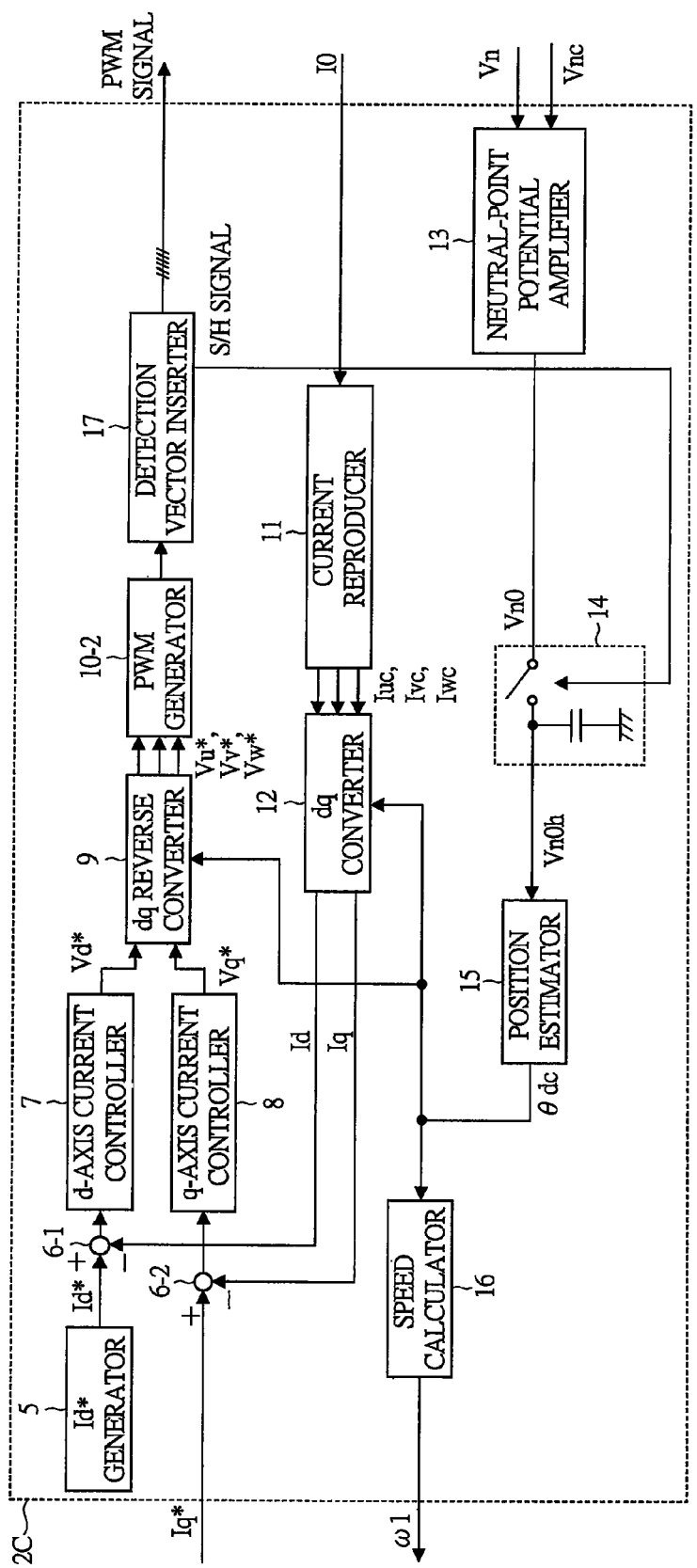
FIG. 10 is a block diagram showing a configuration of a controller of a third embodiment.

FIG. 10 is a block diagram showing a configuration of a controller 2C of the present embodiment. In the present embodiment, this controller 2C is used instead of the controller 2 of the first embodiment.

The controller 2C is different from the controller 2 in that a detection vector inserter 17 is inserted after the PWM generator 10 and before the position where an output is produced as the PWM signal. Also, the point that a signal is output to the sample/hold circuit 14 from the vector inserter 17 is different from the first embodiment.

The detection vector inserter 17 is a circuit for applying detection vectors to the output of the PWM generator 10.

Figure 11A:
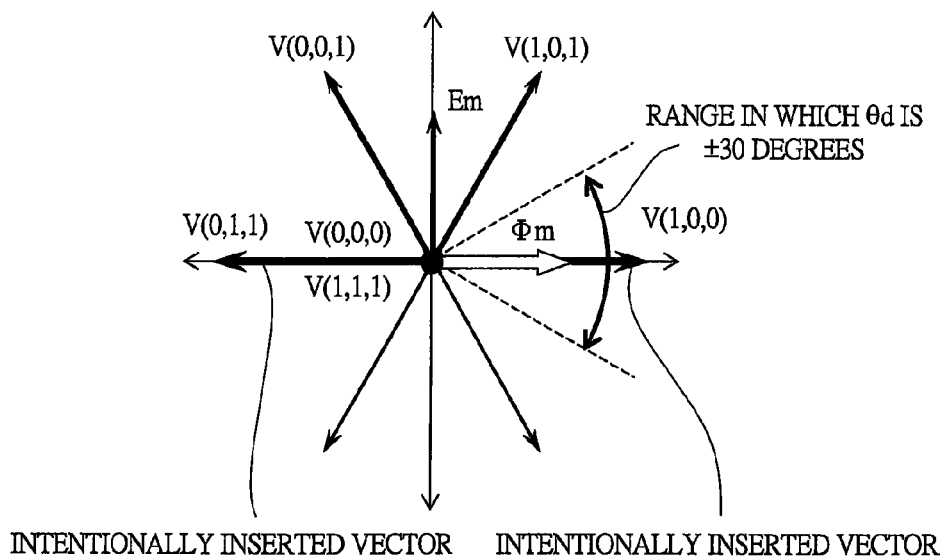
FIG. 11A is a vector diagram showing the voltage vectors which are intentionally inserted in order to detect the neutral-point potentials according to the third embodiment.
Figure 11B:
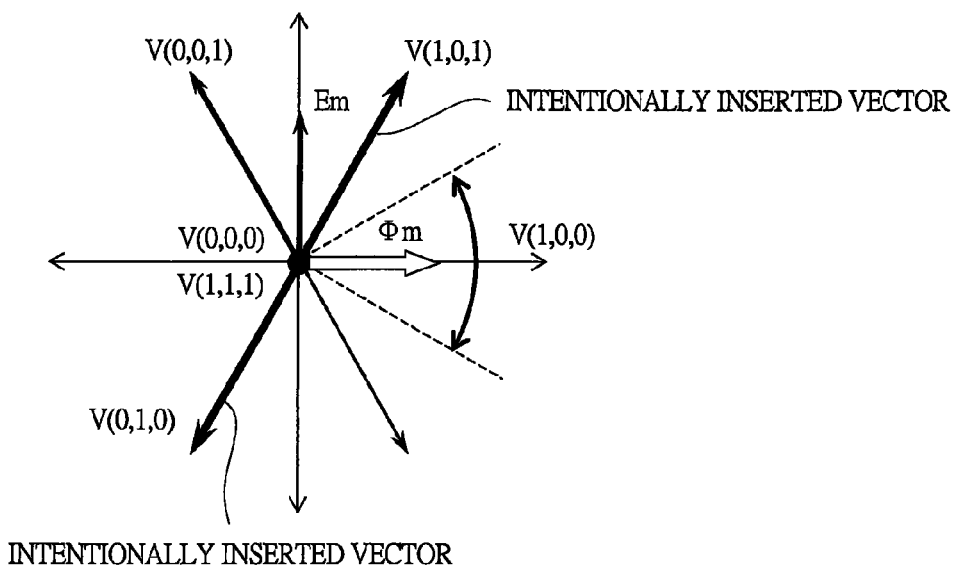
FIG. 11B is a vector diagram showing the voltage vectors which are intentionally inserted in order to detect the neutral-point potentials according to the third embodiment.

FIGS. 11A and 11B are vector diagrams showing the vectors which are intentionally inserted in order to detect the neutral-point potentials according to the present embodiment.

It is assumed that the rotor position θd is in the range of ±30 degrees. The magnet magnetic flux Φm at this point is in the direction that is approximately the same as the voltage vector V(1,0,0). Therefore, as shown in FIG. 11A, when V(1,0,0) is applied to the permanent magnet motor 4, the magnetic flux in the same direction as the magnet magnetic flux is generated by the current. More specifically, the magnet magnetic flux and the magnetic flux caused by the current emphasize each other, and a magnetic saturation state is enhanced. The period of intentionally inserting the detection pulse of the neutral-point potential is defined as "neutral-point potential detection dedicated period".

Similarly, in the case of the voltage vector V(0,1, 1) which is in the opposite direction, it works in the direction that extremely moderates the magnetic saturation. In other words, when the voltage vector for neutral-point potential detection is applied in the direction in which the magnet magnetic flux is present so as to detect the neutral-point potential, the variation of the neutral-point potential becomes large, and position detection sensitivity is enhanced.

Also, the detection sensitivity can be adjusted by controlling the length of the period to insert the detection voltage vector. More specifically, if the vector is inserted for a long period of time, the current is largely varied by that much, and the neutral-point potential is also largely varied, so that the sensitivity adjustment can be facilitated.

FIG. 12A is a diagram showing the state of actual modulation of pulse widths by use of a triangle-wave carrier and the state of changes of the voltage vector and the neutral-point potential at that point in the third embodiment. Similarly to the case of FIG. 6, the PWM pulses are created by the comparison with the triangle-wave carrier. Then, as can be seen from PVu of the PWM pulses in (b) of this figure, V(0,1, 1) and V(1,0,0) are inserted to zero-vector periods (the lower and upper dead points of the triangle-wave carrier), respectively. The sensitivity is adjusted by adjusting the insertion time (equipotential period insertion sampling periods). As shown in (d) of FIG. 12A, the actual neutral-point potential is largely varied in the newly-inserted voltage vector periods.

In this figure, the periods of the voltage vectors enclosed by squares are the "neutral-point potential detection dedicated periods".

Further, V(1,0,1) and V(0,1,0) may be inserted to "the neutral-point potential detection dedicated periods" like in FIG. 11B. The magnet magnetic flux of the rotor approaches to the voltage vector V(1,0,1) because it rotates anticlockwise. More specifically, the "change" of the neutral-point potential at V(1,0,1) is most intensive. Regarding this "change", as it can be understood by viewing the vicinity of θd=0 degree in FIG. 7, the neutral-point potential is largely changed from the positive value of +0.055 V at the point of θd=330 degrees to the negative value of −0.053 V at the point of θd=30 degrees. Therefore, when the voltage vector V(1,0, 1) is intentionally inserted and the neutral-point potential in this period is observed, the phase change of the rotor can be readily observed, and θd=0 degree can be detected by, for example, comparing zero cross by a comparator.

When the voltage vector V(1,0,1) is inserted, the voltage different from the voltage that is essentially needed for motor drive is added, and therefore, V(0,1,0) which is the voltage vector of the opposite side is inserted so as to maintain the overall voltage balance.

The change of waveforms with respect to FIG. 11B is shown in FIG. 12B.

Since the voltage vector V(1,0,1) is the vector that is same as the voltage essentially needed in the period of θd=+30 degree, the essentially needed output period may be extended, and the amount corresponding to the extension may be compensated for by V(0,1,0) which is the vector in the opposite direction.

Meanwhile, under the conditions of FIG. 12A and FIG. 12B, there are phases in which the number of times of switching is increased (in FIG. 12A, the number of times of switching of the pulses of the U phase (PVu) is increased). The number of times of switching is increased because the voltage vectors for neutral-point potential detection are intentionally inserted. However, the increase of the number of times of switching is suppressed as much as possible by inserting them to the periods of the zero vectors (V(1, 1, 1), V(0, 0, 0)). In the position estimation, the neutral-point potential in the insertion voltage vector periods is sampled, and the position estimation can be carried out in the same manner as the first embodiment and the second embodiment.

Furthermore, if a method of saturating one phase of the three phases to the positive side or the negative side (two-phase switching) is introduced as a PWM switching method, the number of times of switching can be suppressed.

Since the width of sensitivity adjustment of position estimation is expanded by virtue of the present embodiment, the present invention can be applied also to permanent magnet motors having various characteristics.

Fourth Embodiment

Next, a fourth embodiment of the present invention will be described.

In the third embodiment, only the U phase is the target of the voltage vector application. On the contrary, in the present embodiment, the V phase and the W phase also serve as the targets of the voltage vector application. By this means, the more highly sensitive position detection can be achieved.

Figure 13:
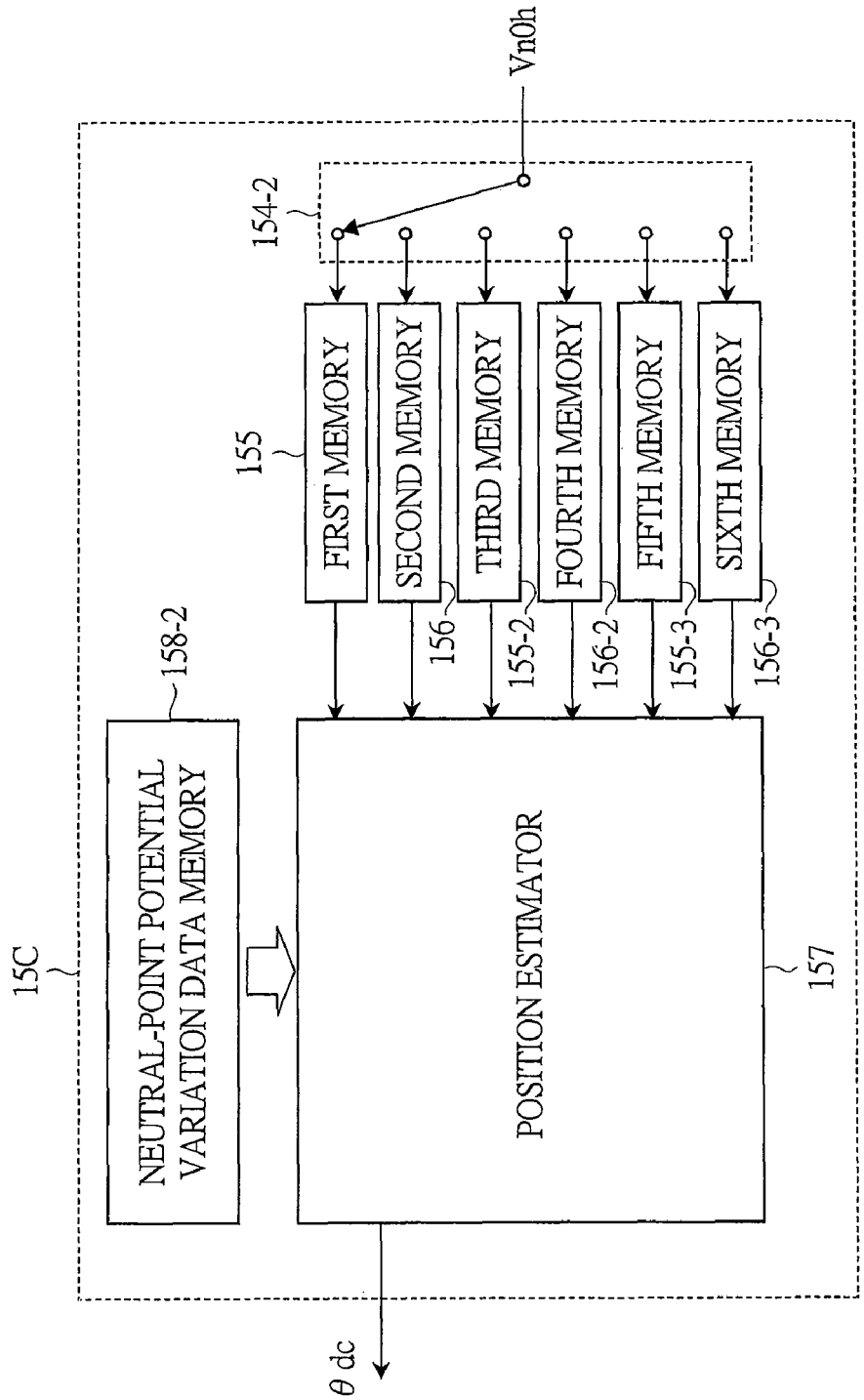
FIG. 13 is a block diagram showing a configuration of a position estimator according to a fourth embodiment.

FIG. 13 is a block diagram showing a configuration of a position estimator 15C according to the fourth embodiment. In the present embodiment, the position estimator 15C is used instead of the position estimator 15 of the third embodiment.

The position estimator 15C is different from the position estimator 15B in the point that three sets of memories are provided for each of the phases (first memory 155, second memory 156, third memory 155-2, fourth memory 156-2, fifth memory 155-3, and sixth memory 156-3) and the point that a neutral-point potential variation data memory 158-2 is provided so as to correspond to the amount of the three phases. Moreover, with the increased number of the memory sets, the number of switching destinations of the switch 154-2 is increased.

Figure 14:
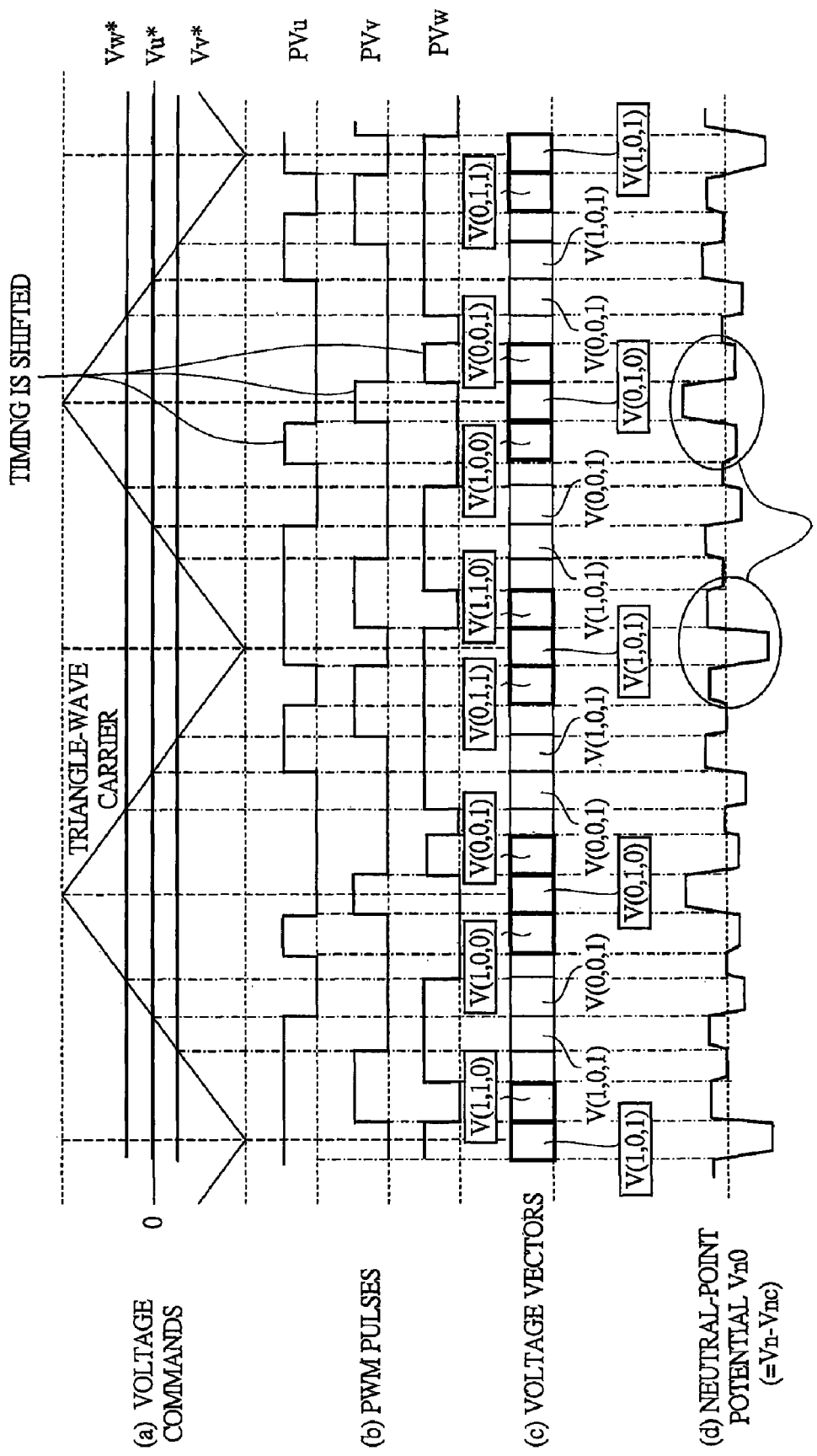
FIG. 14 is a diagram showing the state of actual modulation of pulse widths by use of a triangle-wave carrier and the state of changes of the voltage vector and the neutral-point potential at that point in the fourth embodiment.

FIG. 14 is a diagram showing the state of actual modulation of pulse widths by use of a triangle-wave carrier and the state of changes of the voltage vector and the neutral-point potential at that point in the fourth embodiment. Unlike the third embodiment, V(1,0,1) and V(0,1,0) or V(1,1,0) and V(0,0,1) are inserted to not only PVu but also PVv and PVw of the PWM pulses of (b) in the fourth embodiment.

However, if the insertion voltages are input to each of the phases at the same time, the insertion voltages cancel each other. For its prevention, the periods of insertion are shifted forward or backward in the vicinities of the zero vector periods.

Also in this figure, the "neutral-point potential detection dedicated periods" are expressed by enclosing the notes of voltage vectors by squares.

By this means, the potential variations at the time of applying all the voltage vectors can be observed, and the present invention can be applied to permanent magnet motors having further various characteristics.

Fifth Embodiment

Next, a fifth embodiment of the present invention will be described.

Figure 15:
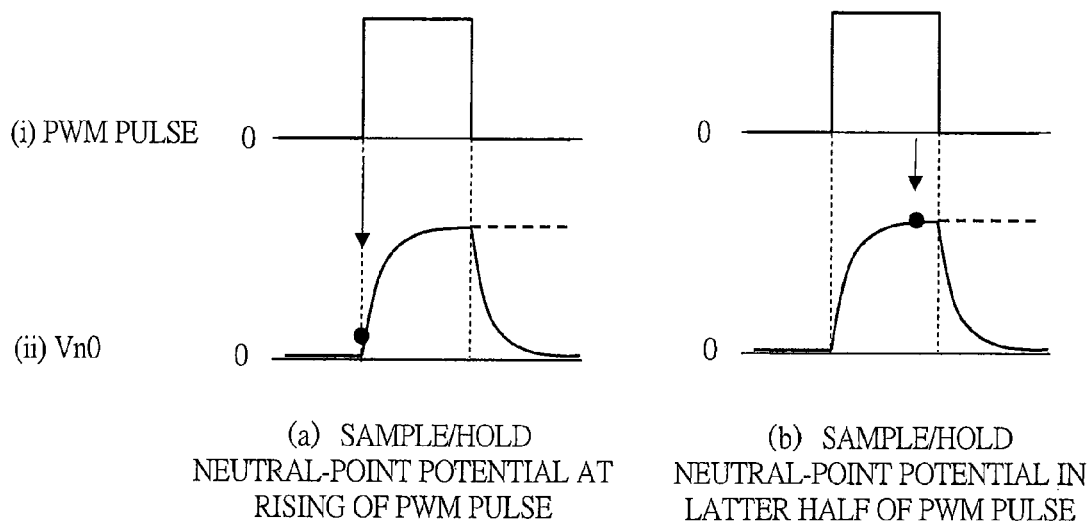
FIG. 15 is a conceptual diagram about sampling timing of an induced voltage in a sample/hold circuit according to a fifth embodiment.

FIG. 15 is a conceptual diagram about sampling timing of an induced voltage related to the sample/hold circuit 14. As described above, detecting the neutral-point potential is the principle of the present invention. If the PWM pulse draws a square shape like in (i) of FIG. 15, no problem occurs. However, application of the voltage vector is accompanied by a transient phenomenon, and the actual neutral-point potential draws a gentle curve like in (ii) of FIG. 15.

In the case in which a normal PWM waveform not using the insertion voltage is used like the first embodiment and the second embodiment, conditions in which the applied pulse is short such as the case in which the carrier frequency is high are often used. When sampling is carried out immediately after the rising like in the case of (a) of FIG. 15, the potential that is essentially needed cannot be obtained and malfunctioning occurs in some cases. Moreover, also in the third embodiment, the period of the newly-inserted voltage vector is preferably as short as possible in order to reduce the deformation of waveforms. When the period of the voltage vector is shortened in this manner, a problem similar to that of the first embodiment occurs.

Therefore, in order to avoid neutral-point potential detection in the transient state, it is desirable to carry out the sampling of the neutral-point potential in a latter half (in the part after an intermediate point of a pulse) of the voltage vector as much as possible ((b) in FIG. 15). In other words, when the sampling of the neutral-point potential is carried out by using the falling edge of the PWM pulse, the potential close to a final result can be obtained.

Thus, sensorless drive with higher accuracy can be realized.

Sixth Embodiment

Next, a sixth embodiment of the present invention will be described.

As described in the third embodiment, the variation amount of the neutral-point potential is strongly dependent on the magnetic circuit characteristics of the motor. In the third embodiment, the voltage vector for neutral-point potential observation is inserted, but there is a risk of increase of loss in the inverter main circuit 32 and others due to the increase of the number of times of switching. An object of the present embodiment is to prevent the increase of loss.

Figure 16:
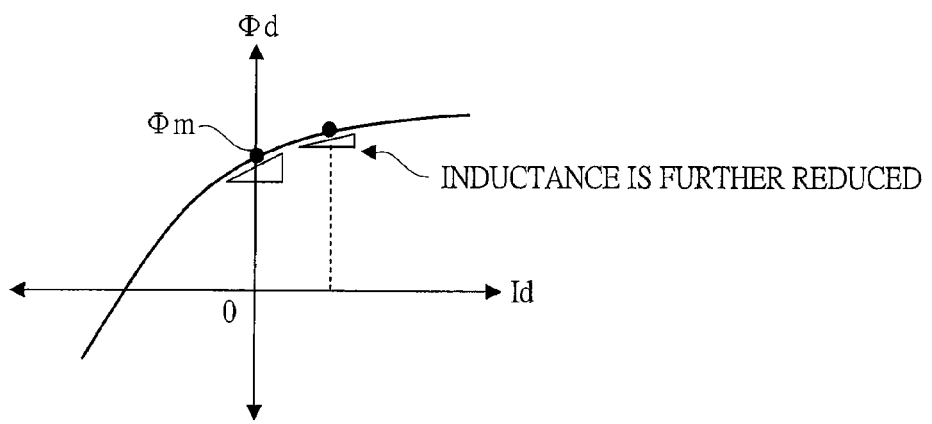
FIG. 16 is a diagram showing a magnetic characteristic of a d axis of the permanent magnet motor (magnetic flux axis in which permanent magnet is present) according to a sixth embodiment.

FIG. 16 is a diagram showing a magnetic characteristic of the d axis (magnetic-flux axis in which the permanent magnet is present) of the permanent magnet motor.

In the state where the current Id of the d axis is zero, the magnet magnetic flux Φm is present. When a current flows in the positive direction of the d axis, magnetic saturation is enhanced, and as a result, inductance is reduced. The inductance in this case is dΦ/dI. Also, when a current flows in the negative direction of the d axis, the inductance is increased.

Therefore, when a d-axis current is caused to flow in the positive direction, the change (reduction) of the inductance is increased, and the variation of the neutral-point potential becomes larger. In other words, the rotor position information can be obtained with high sensitivity.

Figure 17:
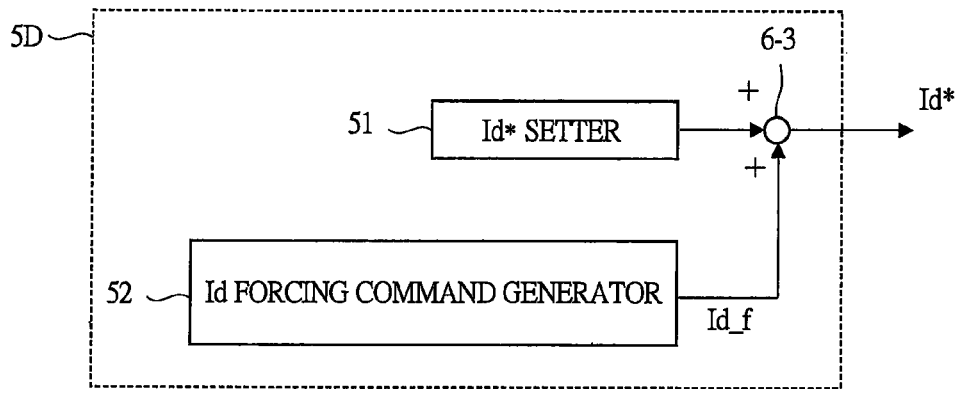
FIG. 17 is a block diagram showing a configuration of an Id* generator according to the sixth embodiment.

FIG. 17 is a block diagram showing a configuration of an Id* generator 5D according to the sixth embodiment. In the present embodiment, this Id* generator 5D is used instead of the Id* generator 5 of the first embodiment. The Id* generator 5D comprises an Id* setter 51 corresponding to the Id* generator 5 of the first embodiment, an Id forcing command generator 52, and an adder 6-3.

The Id* setter 51 outputs "zero" for outputting the above-described magnet magnetic flux Φm of FIG. 16. On the other hand, the Id forcing command generator 52 is a circuit which causes Id to flow to the positive side. The outputs of these two circuits are synthesized by the adder 6-3 and output to the subtractor 6-1 as the current command Id*.

The magnetic saturation in the d-axis direction, which is the magnetic flux axis, is further enhanced by this operation, and the variation amount of the neutral-point potential can be increased.

Selection of usage of the present embodiment and the third embodiment will be noted.

In the present embodiment, the d-axis current which is essentially unnecessary is forcibly caused to flow. Therefore, power consumption is increased by the amount corresponding to this current, and the efficiency of the motor is lowered. On the other hand, loss of the inverter (switching loss) does not occur since the number of times of switching is not required to be increased like in the third embodiment.

It is preferred to appropriately select and use them in consideration of the description above.

Seventh Embodiment

Next, a seventh embodiment of the present invention will be described.

Figure 18:
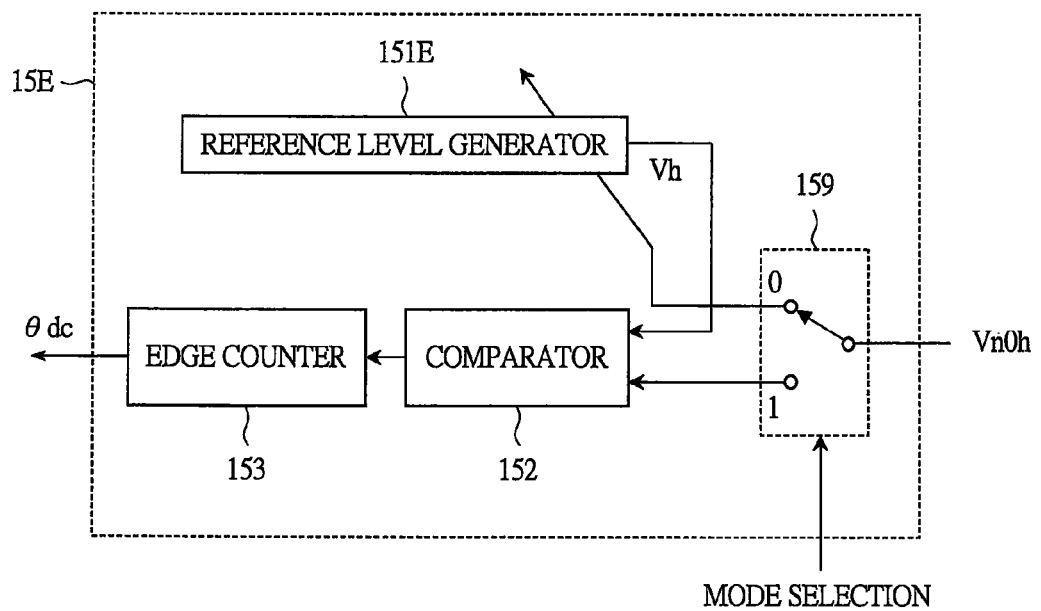
FIG. 18 is a block diagram showing a configuration of a position estimator according to a seventh embodiment.
Figure 19:
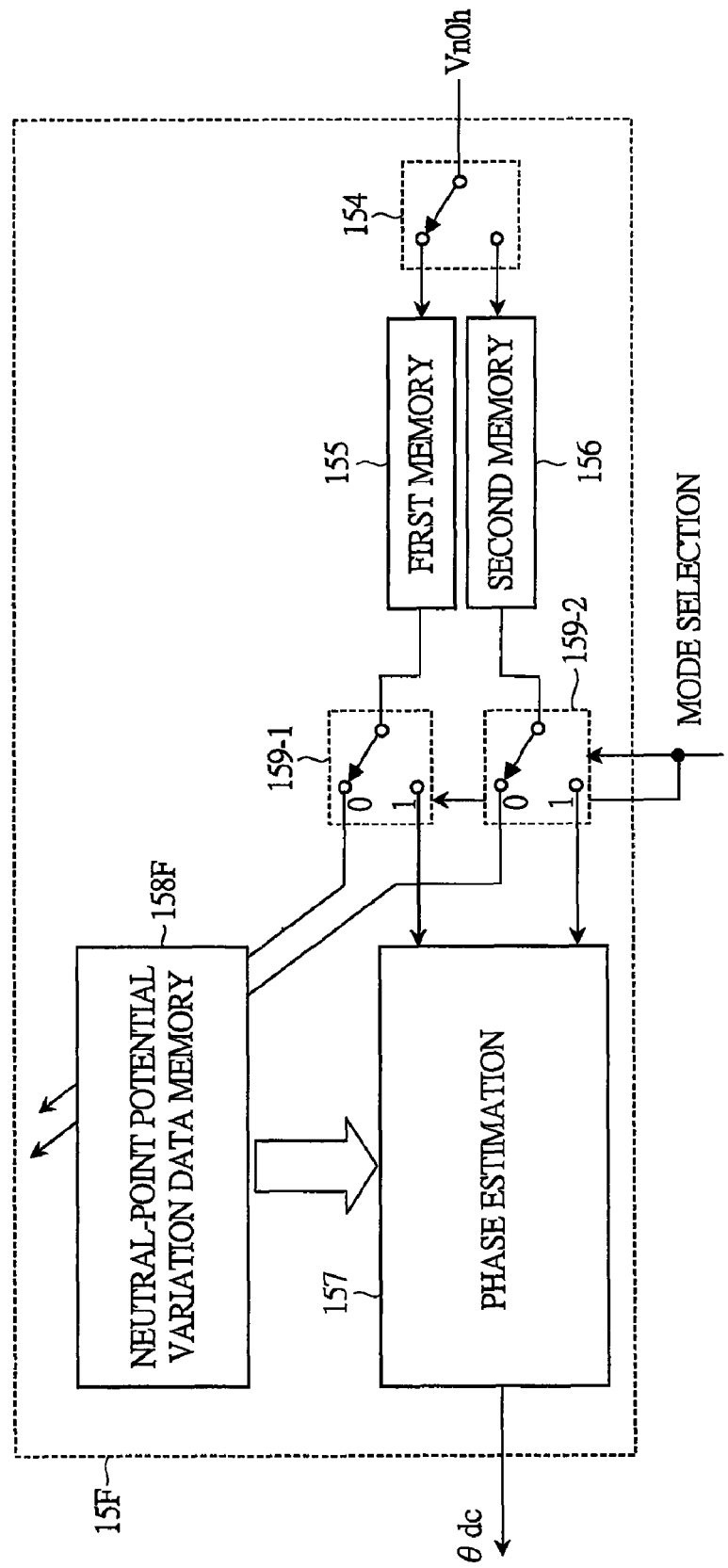
FIG. 19 is a block diagram showing a configuration of another position estimator according to the seventh embodiment.

FIG. 18 is a block diagram showing a configuration of a position estimator 15E according to the present embodiment. The position estimator 15E is an improved version of the position estimator 15 shown in FIG. 8. Meanwhile, FIG. 19 is a block diagram showing a configuration of another position estimator 15F. This is an improved version of the position estimator 15B shown in FIG. 9. In both of the position estimator 15E and the position estimator 15F, mode selector switches (159 in FIG. 18 and 159-1 and 159-2 in FIG. 19) are added. The mode selector switches are characteristics of the present embodiment.

As described above, in the present invention, the rotor position is detected based on the variation amount of the neutral-point potential of the permanent magnet motor 4. Therefore, the correlation between the neutral-point potential and the rotor phases has to be measured in advance.

On the other hand, the correlation between the neutral-point potential and the rotor phases is largely dependent on the magnetic circuit characteristics of the motor. Therefore, for example, when the specifications of the motor are changed, re-measurement has to be carried out.

Therefore, the mode selector switches are provided so that adjustment of a reference level generator (151E of FIG. 18) and setting of the neutral-point potential variation data in a neutral-point potential variation data memory (158F of FIG. 19) can be carried out before the actual drive.

Specifically, when the setting is to be carried out, the respective mode selector switches are set to the "0" side, and the permanent magnet motor is drive in an open loop (the number of rotations is kept constant, and feed forward drive is carried out). At this point, the variation data of the neutral-point potential and the reference level are rewritten. After creation of the data, the mode selector switches are set to the "1" side, and transition to normal control is made. Thus, the same operations as the position estimator 15 shown in FIG. 8 and the position estimator 15B shown in FIG. 9 are carried out.

As described above, by virtue of the present embodiment, the reference level corresponding to the motor can be set or the neutral-point potential variation data can be automatically generated, so that the operation efficiency can be improved.

Eighth Embodiment

Next, an eighth embodiment of the present invention will be described.

The present invention employs the position sensorless method utilizing the variation of the neutral-point potential. However, the current mainstream of the sensorless drive methods of permanent magnet motors is the method utilizing an induced voltage which is generated with rotations. In this method, the position estimation in an extremely-low-speed range is difficult, and the method of the present invention is more effective. On the other hand, the method of utilizing the induced voltage has an advantage that the rotor position can be estimated from instantaneous voltage and current, and this method sometimes exhibits the better characteristics in the performance in a high-speed range than the method of the present invention.

Therefore, it is desirable for the optimization of a whole system that the sensorless method using the induced voltage and the method utilizing the neutral-point potential according to the present invention are appropriately selected and used in accordance with the rotation speed.

Figure 20:
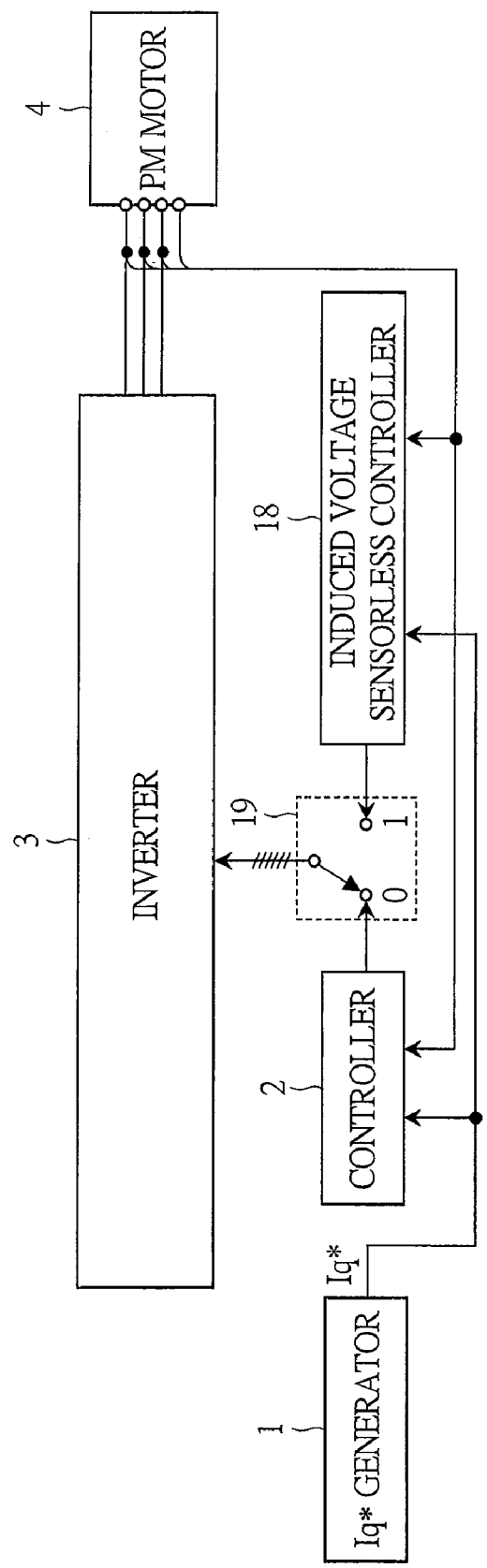
FIG. 20 is a block diagram showing a configuration of a motor drive system of an eighth embodiment.

FIG. 20 is a block diagram showing a configuration of a motor drive system of the eighth embodiment. In FIG. 20, an induced voltage sensorless controller 18 and a switch 19 are added. A high-quality motor drive system can be realized by switching the induced voltage sensorless controller 18 and the controller 2 of the present invention in accordance with the rotation speed range.

Ninth Embodiment

Finally, a ninth embodiment of the present invention will be described.

Figure 21:
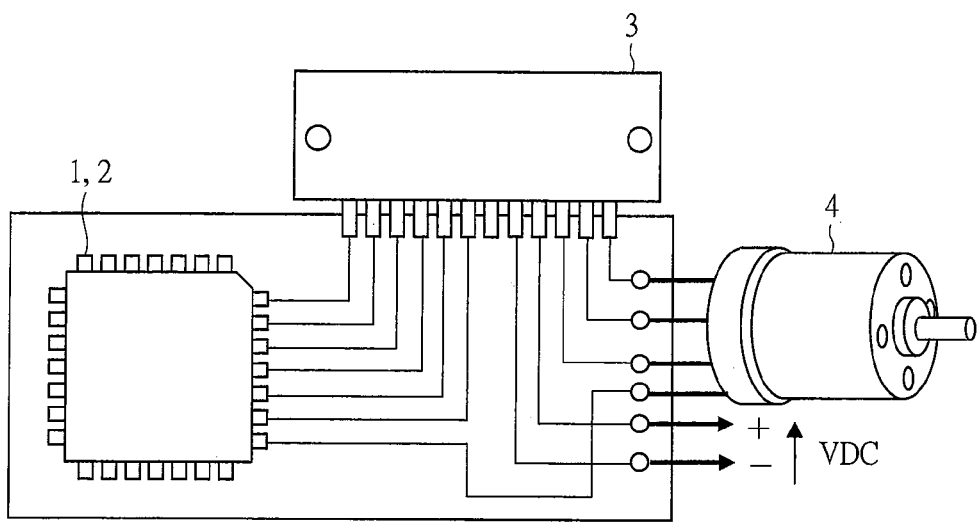
FIG. 21 is a drawing showing an actual state of a drive system of a permanent magnet motor according to a ninth embodiment.

FIG. 21 is a drawing showing an actual state of a drive system of a permanent magnet motor according to the present embodiment. In this figure, the Iq* generator 1 and the controller 2 are realized by one integrated circuit, and the inverter 3 is driven by PWM pulse waveforms output therefrom.

In the inverter 3, the inverter main circuit 32 and the output pre-driver 33 are integrated (formed into one package), thereby realizing the downsizing. Application to various usages and capacities becomes possible by forming the controller 2 as a general-purpose LSI.

Figure 22:
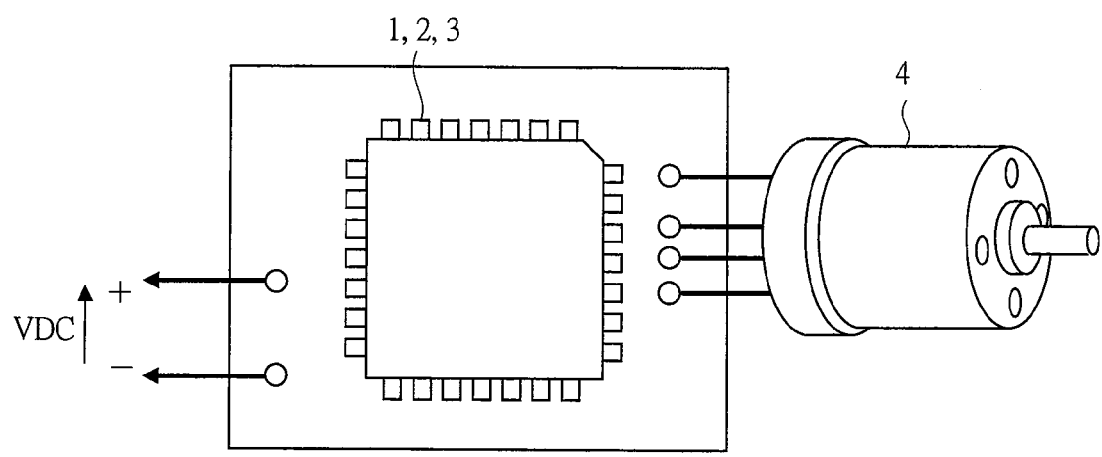
FIG. 22 is a drawing showing an actual state of a drive system of a permanent magnet motor realized by forming an Iq* generator, a controller, and an inverter into one chip.

FIG. 22 is a drawing showing an actual state of a drive system of a permanent magnet motor realized by forming the Iq* generator 1, the controller 2, and the inverter 3 as one chip. As advantages of this embodiment, variable drive of the permanent magnet motor 4 can be realized by connecting the permanent magnet motor 4 and a power source, and the whole system can be downsized when a small-sized motor is to be driven.

Moreover, when the control part is formed as an integrated circuit, high-speed calculations with the calculating speed of several to several tens of μs or less can be realized. In each of the embodiments of the present invention, complex calculations are not needed, and the sensorless drive from a low speed can be realized without drastically increasing the number of gates. When a microcomputer, DSP, or the like is used in control, increasing the calculation processing speed is difficult, but this problem is significantly solved by using a dedicated integrated circuit as a control unit, and the effects of the present invention are increased.

In the foregoing, the invention made by the inventors of the present invention has been concretely described based on the embodiments. However, it is needless to say that the present invention is not limited to the foregoing embodiments and various modifications and alterations can be made within the scope of the present invention.

An example will be described. The present invention is characterized by detecting the three-phase coil connecting-point potential Vn of the permanent magnet motor 4. In the description above, for the readiness of the detection of the neutral-point potential, the virtual neutral-point circuit 34 is introduced for generating the reference potential, and a difference between this potential and the three-phase coil connecting-point potential Vn is derived. However, if the connecting-point potential of the three-phase coil of the permanent magnet motor 4 can be detected, the reference potential can be taken from anywhere. For example, the potential obtained by equally dividing the voltage of the DC power source 31 may be used as the reference, or the ground of the DC power source may be used as the reference potential. In this case, the same result can be obtained by subtracting the amount of offset therefrom.

As described above, the present invention is the technique for building a sensorless motor drive system. The application range of this motor includes rotation speed control of, for example, driving of hard disk drives, cooling and heating devices, optical disk drivers, spindle motors, fans, pumps, and compressors.

What is claimed is:

1. A drive system of a synchronous motor comprising:
an inverter outputting a sine-wave AC current;
a three-phase synchronous motor connected to the inverter;
a first controller detecting a neutral-point potential of the three-phase synchronous motor and outputting a pulse-width modulation signal to the inverter based on a result of the detection, thereby controlling the inverter;
a second controller provided with a circuit that detects or estimates an induced voltage of the three-phase synchronous motor and outputting a pulse-width modulation signal to the inverter based on a detection value or an estimation value of the induced voltage, thereby controlling the inverter; and
a virtual neutral-point circuit which generates a virtual neutral-point potential with respect to an output voltage of the inverter,
wherein the first controller includes a sample/hold circuit which derives a sampling value by synchronizing the neutral-point potential of the three-phase synchronous motor with the pulse-width modulation signal,
wherein the sample/hold circuit receives a value with respect to a difference between the virtual neutral-point potential generated by the virtual neutral-point circuit and a three-phase coil connecting point potential of the three-phase synchronous motor, and
wherein, based on the sampling value, the first controller estimates a position of a rotor of the three-phase synchronous motor.

2. The drive system of the synchronous motor according to claim 1,
wherein the first controller provides a period in which at least one phase of a three-phase output potential of the inverter has a potential different from the other two phases, and
in the period, the sample/hold circuit samples the neutral-point potential and derives the sampling value.

3. The drive system of the synchronous motor according to claim 2,
wherein a neutral-point potential detection dedicated period which is a period in which at least one phase has a potential different from the other two phases is inserted in a period in which all of the output potentials of the three phases of the inverter are mutually equal, and the sample/hold circuit further samples the neutral-point potential in the neutral-point potential detection dedicated period.

4. The drive system of the synchronous motor according to claim 3,
wherein the pulse-width modulation signal is generated based on comparison between a triangle-wave carrier signal and an AC voltage command applied to the three-phase synchronous motor, and
the sample/hold circuit samples the neutral-point potential around an upper dead point and a lower dead point of the triangle-wave carrier signal.

5. The drive system of the synchronous motor according to claim 1,
wherein the first controller provides two or more periods in which at least one phase of a three-phase output potential of the inverter has a potential different from the other two phases, and
in the periods, the sample/hold circuit samples the neutral-point potential and derives the sampling value.

6. The drive system of the synchronous motor according to claim 1,
wherein, when the sample/hold circuit samples/holds the neutral-point potential of the period in which the at least one phase has the potential different from the other two phases, a timing of holding the neutral-point potential is in a latter-half period later than an intermediate point of the period in which the at least one phase has the potential different from the other two phases.

7. The drive system of the synchronous motor according to claim 1,
wherein the drive system is formed on a same semiconductor substrate.

8. A drive system of a synchronous motor comprising:
an inverter outputting a sine-wave AC current;
a three-phase synchronous motor connected to the inverter;
a first controller detecting a neutral-point potential of the three-phase synchronous motor and outputting a pulse-width modulation signal to the inverter based on a result of the detection, thereby controlling the inverter;
a second controller provided with a circuit that detects or estimates an induced voltage of the three-phase synchronous motor and outputting a pulse-width modulation signal to the inverter based on a detection value or an estimation value of the induced voltage, thereby controlling the inverter; and
a switch that switches an output of the first controller and an output of the second controller and outputs either one of the outputs to the inverter,
wherein, if the number of rotations of the three-phase synchronous motor is less than a predetermined threshold value, the output of the first controller is selected by the switch and output to the inverter, and if the number of rotations is equal to or more than the threshold value, the output of the second controller is selected by the switch and output to the inverter.

9. The drive system of the synchronous motor according to claim 8,
wherein the drive system is formed on a same semiconductor substrate.

* * * * *